United States Patent
Yang et al.

(10) Patent No.: US 8,520,494 B2
(45) Date of Patent: Aug. 27, 2013

(54) PRECODING METHOD FOR REDUCING UPLINK PAPR AND APPARATUS THEREOF

(75) Inventors: Suck Chel Yang, Anyang-si (KR); Joon Kui Ahn, Anyang-si (KR); Dong Youn Seo, Anyang-si (KR); Dae Won Lee, Anyang-si (KR); Yu Jin Noh, Anyang-si (KR); Bong Hoe Kim, Anyang-si (KR); Jung Hoon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 291 days.

(21) Appl. No.: 13/001,474

(22) PCT Filed: Aug. 13, 2009

(86) PCT No.: PCT/KR2009/004527
§ 371 (c)(1),
(2), (4) Date: Dec. 27, 2010

(87) PCT Pub. No.: WO2010/021468
PCT Pub. Date: Feb. 25, 2010

(65) Prior Publication Data
US 2011/0096658 A1 Apr. 28, 2011

Related U.S. Application Data

(60) Provisional application No. 61/090,611, filed on Aug. 20, 2008, provisional application No. 61/157,891, filed on Mar. 5, 2009.

(30) Foreign Application Priority Data

Jul. 30, 2009 (KR) .................. 10-2009-0070070

(51) Int. Cl.
*H04L 5/0007* (2006.01)
*H04L 27/2647* (2006.01)
*H04B 1/50* (2006.01)
*H04B 7/18582* (2006.01)
*H04B 1/707* (2011.01)
*H04B 17/0065* (2006.01)
*H04W 28/04* (2009.01)
*H04J 3/047* (2006.01)

(52) U.S. Cl.
USPC ........... 370/204; 370/210; 370/281; 370/319; 370/329; 370/335; 370/344; 370/537; 375/228; 375/260

(58) Field of Classification Search
USPC ................. 370/210, 276–296, 310–350, 204, 370/249; 375/130–153, 256–366, 228; 455/450, 452.1
See application file for complete search history.

(56) References Cited

U.S. PATENT DOCUMENTS 7,629,902 B2 * 12/2009 Zhang et al. .................. 341/106
7,808,886 B2 * 10/2010 McCoy ......................... 370/210

(Continued)

FOREIGN PATENT DOCUMENTS

WO WO 2007/095102 A1 8/2007

OTHER PUBLICATIONS

3GPP TS 36.213 V8.3.0 (May 2008) 3rd Generation Partnership Project; Technical Specification Group Radio Access Network; Evolved Universal Terrestrial Radio Access (E-UTRA); Physical Layer procedures (Release 8).*

(Continued)

*Primary Examiner* — Un C Cho
*Assistant Examiner* — Peian Lou
(74) *Attorney, Agent, or Firm* — Birch, Stewart, Kolasch & Birch, LLP

(57) ABSTRACT

A radio communication system is provided. An uplink transmission method of a user equipment in a radio communication system includes performing Fourier transform on one or more data sequences to generate one or more first frequency-domain sequences, applying precoding for multi-antenna transmission to the one or more first frequency-domain sequences to generate one or more second frequency-domain sequences; performing inverse Fourier transform on the one or more second frequency-domain sequences to generate one or more transmission symbols, and transmitting the one or more transmission symbols via multiple antennas.

13 Claims, 27 Drawing Sheets

(56) References Cited

U.S. PATENT DOCUMENTS

| | | |
|---|---|---|
| 8,149,938 B2 * | 4/2012 | Shen et al. .................... 375/261 |
| 2005/0041622 A1 | 2/2005 | Dubuc et al. |
| 2005/0047517 A1 | 3/2005 | Georgios et al. |
| 2007/0171864 A1 * | 7/2007 | Zhang et al. ................. 370/329 |
| 2007/0189151 A1 * | 8/2007 | Pan et al. ..................... 370/210 |
| 2007/0297386 A1 * | 12/2007 | Zhang et al. ................. 370/344 |
| 2008/0260059 A1 * | 10/2008 | Pan .............................. 375/260 |
| 2009/0080549 A1 * | 3/2009 | Khan et al. ................... 375/260 |

OTHER PUBLICATIONS

Interdigital Communications Corporation, "Uplink MIMO SC-FDMA Scheme for EUTRA", 3GPP TSG RAN WG1 #43 R1-051368, pp. 1-5, Nov. 11, 2005.

* cited by examiner

PRECODING METHOD FOR REDUCING UPLINK PAPR AND APPARATUS THEREOF

This application is the National Phase of PCT/KR2009/004527 filed on Aug. 13, 2009, which claims priority under 35 USC 119(e) to U.S. Provisional Application Nos. 61/090,611 filed on Aug. 20, 2008 and 61/157,891 filed Mar. 5, 2009, and under 35 USC 119(a) to Korean Patent Application No. 10-2009-0070070 filed Jul. 30, 2009. The entire contents of the above applications are hereby incorporated by reference into the present application.

TECHNICAL FIELD

The present invention relates to a radio communication system. The present invention relates to a radio communication system for supporting at least one of Single Carrier-Frequency Division Multiple Access (SC-FDMA), Multi Carrier-Frequency Division Multiple Access (MC-FDMA) and Orthogonal Frequency Division Multiple Access (OFDMA) and, more particularly, to a precoding method for reducing an uplink Peak-to-Average Power Ratio (PAPR) in a radio communication system and an apparatus thereof.

BACKGROUND ART

A $3^{rd}$ Generation Partnership Project (3GPP) based on Wideband Code Division Multiple Access (WCDMA) radio access technology has been developed in the whole world. High Speed Downlink Packet Access (HSDPA), which may be defined as the first evolution of WCDMA, provides radio access technology having high competitiveness in the mid-term future to 3GPP. As a system for providing high competitiveness in the mid-term future, there is an Evolved-Universal Mobile Telecommunications System (E-UMTS).

FIG. 1 shows a network architecture of the E-UMTS. The E-UMTS is an evolved form of a WCDMA UMTS, and the standardization thereof is ongoing in the 3GPP. The E-UMTS is also called a Long Term Evolution (LTE) system. For the detailed contents of the technical specifications of the UMTS and the E-UMTS reference may be made to Release 7 and Release 8 of "$3^{rd}$ Generation Partnership Project; Technical Specification Group Radio Access Network", respectively.

Referring to FIG. 1, the E-UMTS may include a User Equipment (UE), a base station (hereinafter, referred to as an "eNode B" or "eNB"), and an Access Gateway (AG) positioned at the end of the network (Universal Terrestrial Radio Access Network; E-UTRAN) and connected to an external network. Generally, the eNode B may simultaneously transmit multiple data streams, for broadcast services, multicast services and/or unicast services. The AG may be divided into a portion for processing user traffic and a portion for processing control traffic. At this time, an AG for processing new user traffic and an AG for processing control traffic may communicate with each other using a new interface. One or more cells may exist in one eNode B. A plurality of eNode Bs may be connected by an interface for transmitting the user traffic or control traffic. A Core Network (CN) may include the AG and a network node for the user registration of the UE. An interface for distinguishing between the E-UTRAN and the CN may be used. The AG manages the mobility of the UE in the unit of Tracking Areas (TAs). The TA is composed of a plurality of cells. When the UE moves from a specific TA to another TA, the UE informs the AG that the TA of the UE is changed.

Although radio access technology has been developed to LTE based on WCDMA, the demands and the expectations of users and providers have been lastingly increased. In addition, since other radio access technologies have been continuously developed, new technology evolution is required for securing high competitiveness in the future. Decrease in cost per bit, increase in service availability, flexible use of a frequency band, simple structure, open interface, suitable UE power consumption and the like are required. The standardization of the subsequent technology of the LTE is ongoing in the 3GPP. In the present specification, the above-described technology is called "LTE-Advanced" or "LTE-A".

In the case of LTE, in downlink transmission, Multiple-Input Multiple-Output (MIMO) is applied and spatial multiplexing is used. However, in uplink transmission, due to problems associated with efficiency of a power amplifier of a UE and the arrangement of antennas, spatial multiplexing is not considered. However, in order to maximize the use of frequency resources or a demand for high-speed communication, the LTE-A requires spatial multiplexing using the MIMO in uplink transmission. In detail, the LTE-A requires spatial multiplexing up to a maximum of four layers in uplink transmission. In addition, the LTE-A requires transmission of a maximum of two transmission blocks via one subframe per component carrier in the case of multiplexing by a single user in uplink transmission. The component carrier refers to a basic frequency block used in carrier aggregation. Carrier aggregation refers to technology for logically combining a plurality of frequency blocks to support a wideband, and the LTE-A uses the frequency aggregation technology, for wideband.

DISCLOSURE

Technical Problem

An object of the present invention devised to solve the problem lies on a method for performing uplink transmission via multiple antennas in a radio communication system and an apparatus thereof.

Another object of the present invention devised to solve the problem lies on a method for applying precoding when uplink transmission is performed using Single Carrier-Frequency Division Multiplexing Access (SC-FDMA) technology and an apparatus thereof.

A further object of the present invention devised to solve the problem lies on a signaling method associated with uplink transmission using multiple antennas and an apparatus thereof.

Technical Solution

The object of the present invention can be achieved by providing an uplink transmission method of a user equipment in a radio communication system, the method including: performing Fourier transform on one or more data sequences to generate one or more first frequency-domain sequences; applying precoding for multi-antenna transmission to the one or more first frequency-domain sequences to generate one or more second frequency-domain sequences; performing inverse Fourier transform on the one or more second frequency-domain sequences to generate one or more transmission symbols; and transmitting the one or more transmission symbols via multiple antennas.

The method may further include continuously or discontinuously mapping the one or more second frequency-domain sequences within a frequency band.

The one or more second frequency-domain sequences may be mapped to a plurality of clusters set within the frequency band. In this case, the precoding for the multi-antenna transmission may be equally applied in cluster units. In this case, precoding matrix may be equally applied in cluster units.

The method may further include receiving one or more Precoding Matrix Indicators (PMIs) from a base station.

A resource unit, to which the PMIs are applied, may include at least one of a subband and a cluster.

The sizes of frequency domains associated with the PMIs may be unequal.

The PMIs may be included in one or more specific fields set within Downlink Control Information (DCI) received via a Physical Downlink Control Channel (PDCCH).

The number of specific fields may be changed according to uplink resources scheduled for the user equipment. In this case, the number of specific fields may be the number of subbands associated with clusters scheduled for the user equipment. The number of specific fields may be the number of clusters scheduled for the user equipment.

The number of specific fields may be constantly maintained regardless of uplink resources scheduled for the user equipment. In this case, the number of specific fields may be set to be equal to the total number of subbands present within the frequency band. If the number of PMIs allocated to the user equipment is smaller than the number of specific fields, a predetermined value may be included in residual fields out of the specific fields.

In another aspect of the present invention, provided herein is a user Equipment configured to perform uplink transmission in a radio communication system, the user equipment including: a Discrete Fourier Transform (DFT) module configured to perform Fourier transform on one or more data sequences to generate one or more first frequency-domain sequences; a precoder configured to apply precoding for multi-antenna transmission to the one or more first frequency-domain sequences to generate one or more second frequency-domain sequences; a Single Carrier-Frequency Division Multiple Access (SC-FDMA) signal generation module configured to perform inverse Fourier transform on the one or more second frequency-domain sequences to generate one or more transmission symbols; and a Radio Frequency (RF) module configured to transmit the one or more transmission symbols via multiple antennas.

The user equipment may further include a module configured to continuously or discontinuously map the one or more second frequency-domain sequences within a frequency band.

In this case, the one or more second frequency-domain sequences may be mapped to a plurality of clusters set within the frequency band. In this case, the precoding for the multi-antenna transmission may be equally applied in cluster units.

A resource unit, to which the PMIs are applied, may include at least one of a subband and a cluster.

The sizes of frequency domains associated with the PMIs may be unequal.

The PMIs may be included in one or more specific fields set within Downlink Control Information (DCI) received via a Physical Downlink Control Channel (PDCCH).

The number of specific fields mY be changed according to uplink resources scheduled for the user equipment. In this case, the number of specific fields may be the number of subbands associated with clusters scheduled for the user equipment. The number of specific fields may be the number of clusters scheduled for the user equipment.

The number of specific fields may be constantly maintained regardless of uplink resources scheduled for the user equipment. The number of specific fields may be set to be equal to the total number of subbands present within the frequency band. If the number of PMIs allocated to the user equipment is smaller than the number of specific fields, a predetermined value may be included in residual fields out of the specific fields.

Advantageous Effects

The embodiments of the present invention have the following effects.

First, it is possible to provide a method for performing uplink transmission via multiple antennas in a radio communication system and an apparatus thereof.

Second, it is possible to provide a method for applying precoding when uplink transmission is performed using Single Carrier-Frequency Division Multiplexing Access (SC-FDMA) technology and an apparatus thereof.

Third, it is possible to provide a signaling method associated with uplink transmission using multiple antennas and an apparatus thereof.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The configuration, operation and other features of the present invention will be understood by the preferred embodiments of the present invention described with reference to the accompanying drawings. The following embodiments are examples of applying the technical features of the present invention to a $3^{rd}$ Generation Partnership Project (3GPP). However, these embodiments are only exemplary and the present invention may be used in any communication system for transmitting a Single Carrier-Frequency Division Multiplexing Access (SC-FDMA) signal using multiple antennas without limit.

Multiple Access Using OFDMA and SC-FDMA

An Orthogonal Frequency Division Multiple Access (OFDMA) scheme uses an Orthogonal Frequency Division Multiplexing (OFDM) scheme. The OFDM scheme divides a data stream of high rate into a plurality of data streams of low rate and simultaneously transmits the plurality of data streams using a plurality of orthogonal subcarriers. The OFDMA scheme provides some of available subcarriers to users so as to realize multiple access. The OFDMA scheme has preferable characteristics such as high spectrum efficiency and robustness to multi-path influences. However, the OFDMA scheme has a disadvantage such as high Peak-to-Average Power Ratio (PAPR). A high PAPR occurs due to in-phase addition of subcarriers. As the number of subcarriers via which one user transmits a signal is increased, the PAPR is increased. The PAPR converges into about 8 dB at a 95% confidence level. In a radio communication system, a high PAPR is not preferable and may deteriorate system performance. In detail, in an OFDMA symbol, peak power may be operated in a nonlinear region or may be clipped to a predetermined value, in a power amplifying process. Accordingly, high peak power may cause signal quality deterioration and signal distortion, and have an influence on channel estimation and data detection. The SC-FDMA scheme is technology suggested for reducing a high PAPR observed in the OFDMA scheme. The SC-FDMA scheme is different from the OFDMA scheme in that data is spread in a frequency domain via Discrete Fourier Transform (DFT) precoding prior to an Inverse Fast Fourier Transform (IFFT) process. If the SC-FDMA scheme is used, the PAPR of a transmitted signal can be comparatively decreased, compared with the case of using the OFDMA scheme. In the present specification, the SC-FDMA scheme is also called a DFT-spread-OFDMA (DFT-s-OFDMA) scheme.

Figure 1:
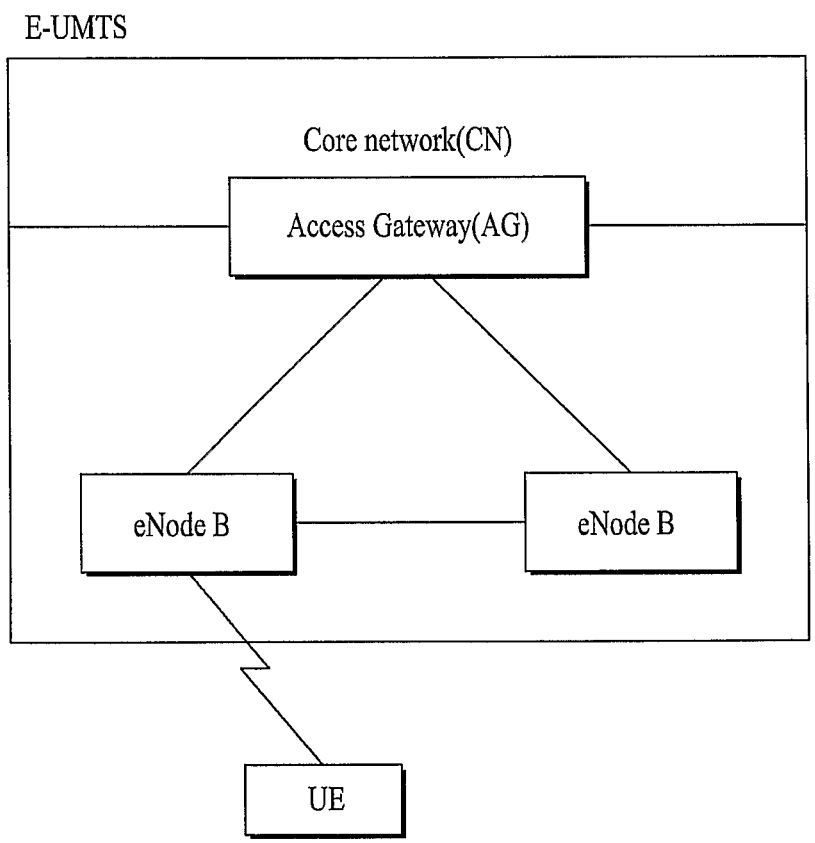
FIG. 1 is a view showing a network architecture of an Evolved-Universal Mobile Telecommunications System (E-UMTS).
Figure 2:
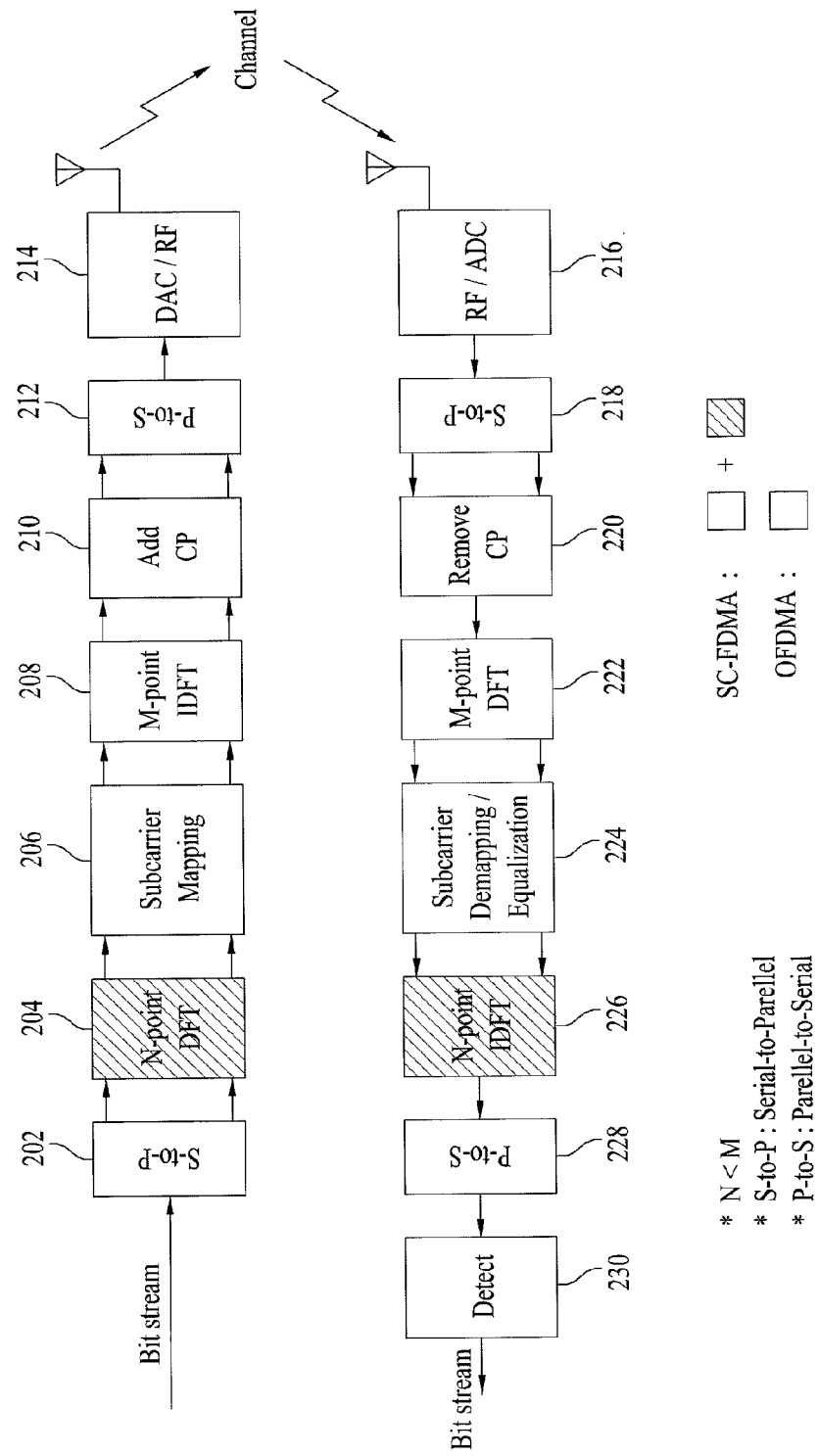
FIG. 2 is a block diagram of a transmitter and a receiver for Orthogonal Frequency Division Multiplexing Access (OFDMA) and Single Carrier-Frequency Division Multiplexing Access (SC-FDMA).

FIG. 2 is a block diagram of a transmitter and a receiver for OFDMA and SC-FDMA. In uplink, the transmitter may be a portion of a User Equipment (UE) and the receiver may be a portion of a base station (eNode B). In downlink, the transmitter may be a portion of an eNode B and the receiver may be a portion of a UE.

Referring to FIG. 2, an OFDMA transmitter includes a serial-to-parallel converter 202, a subcarrier mapping module 206, an M-point IDFT module 208, a Cyclic Prefix (CP) adding module 210, a parallel-to-serial converter 212, and a Radio Frequency (RF)/Digital-to-Analog Converter (DAC) module 214.

A signal processing procedure of the OFDMA transmitter is as follows. First, a bit stream is modulated to a data symbol sequence. The bit stream may be obtained by performing various signal processes such as channel encoding, interleaving and scrambling with respect to a data block received from a Medium Access Control (MAC) layer. The bit stream may be called a codeword and is equivalent to a data block received from the MAC layer. The data block received from the MAC layer is also called a transmission block. A modulation scheme is determined in consideration of a channel state, a buffer state, required service quality and the like, and may include, but not limited to, Binary Phase Shift Keying (BPSK), Quadrature Phase Shift Keying (QPSK) and n-Quadrature Amplitude Modulation (QAM). Thereafter, the serial data symbol sequence is serial-to-parallel converted to N parallel data symbols (202). N data symbols are mapped to allocated N subcarriers out of a total of M subcarriers, and M-N residual subcarriers are padded with 0 (206). Thereafter, the data symbols mapped in the frequency domain are converted into a time-domain sequence by M-point IDFT processing (208). Thereafter, in order to reduce Inter-Symbol Interference (ISI) and Inter-Carrier Interference (ICI), CP is added to the time-domain sequence so as to generate OFDMA symbols (210). The generated OFDM symbols are Parallel-to-serial converted (212). Thereafter, the OFDMA symbols are subjected to procedures such as digital-to-analog conversion and frequency up-conversion and are transmitted to the receiver (214). Available subcarriers out of the residual M-N subcarriers may be allocated to another user for data transmission. An OFDMA receiver includes an RF/Analog-to-Digital Converter (ADC) module 216, a serial-to-parallel converter 218, a CP removal module 220, an M-point DFT module 222, a subcarrier demapping/equalization module 224, a parallel-to-serial converter 228 and a detection module 230. The signal processing procedure of the OFDMA receiver is configured inversely to the OFDMA transmitter.

The SC-FDMA transmitter further includes the N-point DFT module 204 in the previous stage of the subcarrier mapping module 206, compared with an OFDMA transmitter. The SC-FDMA transmitter spreads a plurality of data in the frequency domain by the DFT prior to the IDFT processing, thereby comparatively reducing the PAPR of the transmitted signal, compared with the OFDMA scheme. The SC-FDMA receiver further includes the N-Point IDFT module 226 in the next stage of the subcarrier demapping module 224, compared with the OFDMA receiver. The signal processing procedure of the SC-FDMA receiver is configured inversely to the SC-FDMA transmitter.

The modules shown in FIG. 2 are only illustrative and the transmitter and/or the receiver may further include a necessary module, some of the modules or functions may be omitted or divided into different modules, or two or more modules may be combined into one module.

Figure 3:
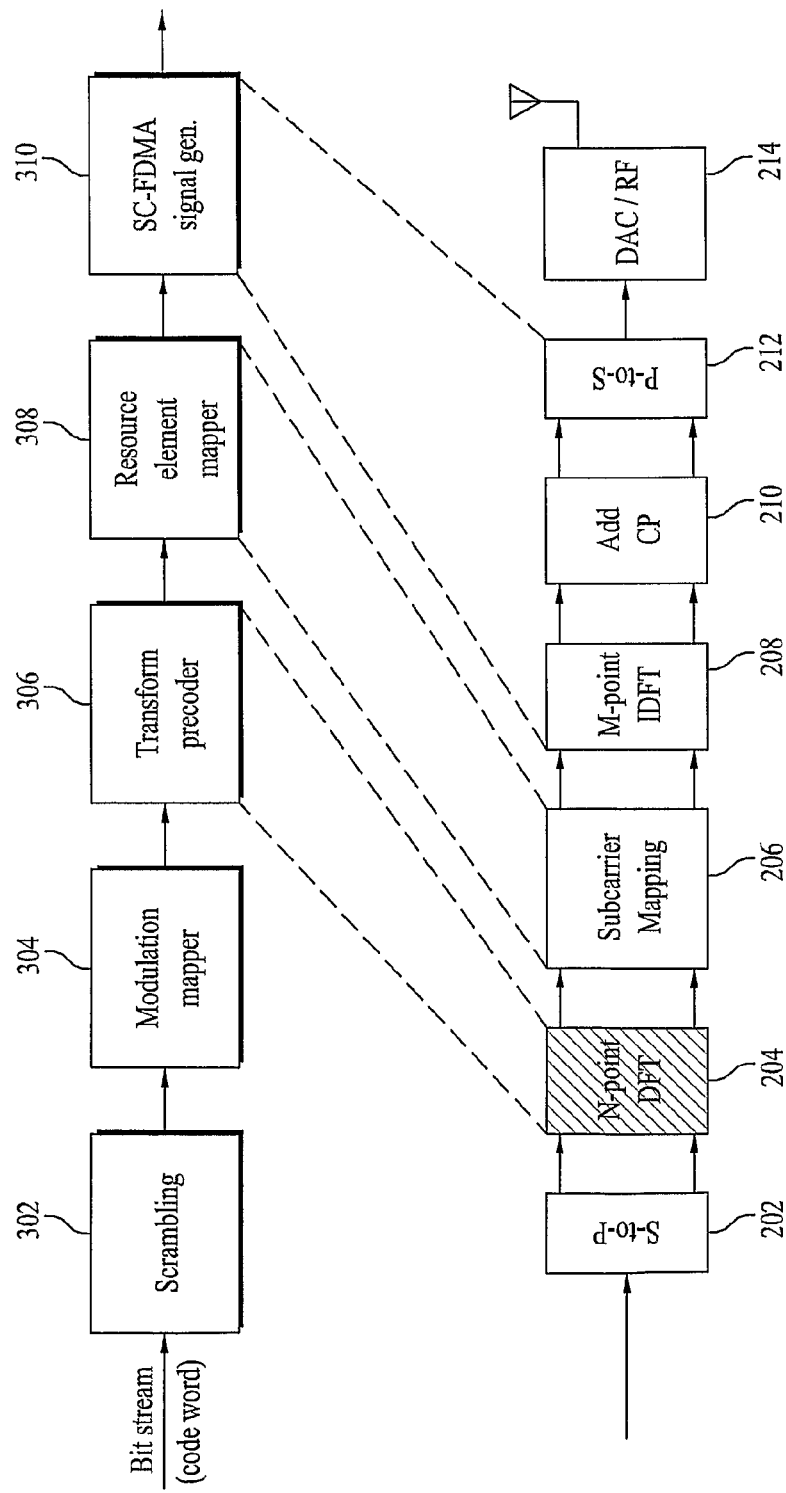
FIG. 3 is a view showing the architecture of an uplink transmitter defined in a Long Term Evolution (LTE) system.

FIG. 3 is a view showing the architecture of an uplink transmitter defined in an LTE system. The LTE system uses the SC-FDMA in uplink transmission and uses the OFDMA scheme in downlink transmission.

Referring to FIG. 3, the SC-FDMA transmitter includes a scrambling module 302, a modulation mapper 304, a transform precoder 306, a resource element mapper 308 and an SC-FDMA signal generation module 310. The signal processing procedure is as follows. The scrambling module 302 may scramble a bit stream using a specific scrambling code/sequence of a UE. The scrambled signal is input to the modulation mapper 304 so as to be modulated to complex symbols by a BPSK, QPSK or 16QAM scheme according to the kind of the transmitted signal and/or the channel state. Thereafter, the modulated complex symbols are processed by the transform precoder 306 and are then input to the resource element mapper 308. The resource element mapper 308 maps the complex symbols to scheduled subcarriers. Thereafter, the signals mapped to the subcarriers may be transmitted in uplink via the SC-FDMA signal generation module 310.

For reference, the transform precoder 306 corresponds to the N-point DFT module 204 of FIG. 2. The resource element mapper 308 corresponds to the subcarrier mapping module 206 of FIG. 2. The SC-FDMA signal generation module 310 corresponds to the M-point IDFT module 208, the CP adding module 210 and the parallel-to-serial converter 212 of FIG. 2. The modules shown in FIG. 3 are only illustrative and the SC-FDMA transmitter may further include a necessary module, some of the modules or functions may be omitted or divided into different modules, or two or more modules may be combined into one module.

Hereinafter, the signal processing procedure of the transform precoder 306 will be described in more detail. The data symbol sequence input to the transform precoder 306 may be complex symbols represented by d(0), . . . , and $d(M_{symb}-1)$. The transform precoder 306 simultaneously processes N data symbols and divides the data symbol sequence into $M_{symb}/N$ sets. The sets finally configure SC-FDMA symbols. N denotes the number of scheduled subcarriers. The data symbols input to the transform precoder 306 may be processed by the following equation.

$$D(l \cdot N + k) = \frac{1}{\sqrt{N}} \sum_{i=0}^{N-1} d(l \cdot N + i) e^{-j \frac{2\pi \cdot i \cdot k}{N}}$$ Equation 1

$$k = 0, \ldots, N-1$$

$$l = 0, \ldots, M_{symb}/N - 1$$

The process of Equation 1 corresponds to a DFT process, and frequency-domain sequences represented by D(0), . . . , $D(M_{symb}-1)$ are generated by the transform precoder 306. The respective values of the frequency-domain sequences determine the amplitudes and the phases of the mapped subcarriers.

Figure 4:
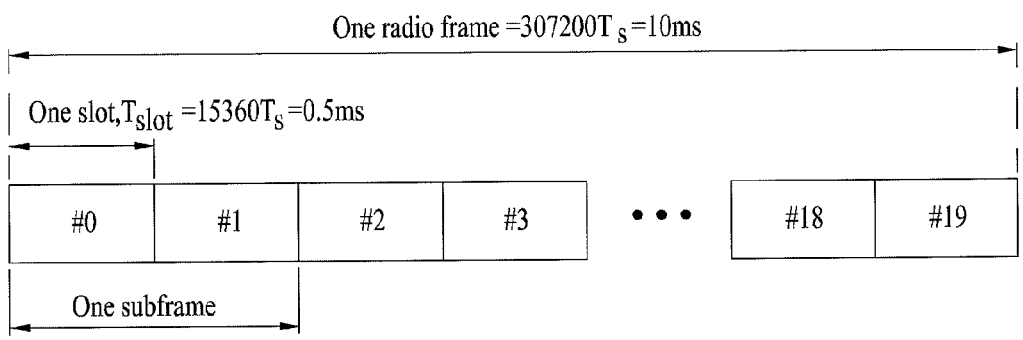
FIG. 4 is a view showing the architecture of a radio frame.

FIG. 4 is a view showing the architecture of a radio frame.

Referring to FIG. 4, the radio frame has a length of 10 ms (327200·$T_s$) and includes 10 subframes with the same size. Each of the subframes has a length of 1 ms and includes two slots. Each of the slots has a length of 0.5 ms (15360·$T_s$). $T_s$ denotes a sampling time, and is represented by $T_s=1/(15 kHz \times 2048)=3.2552 \times 10^{-8}$ (about 33 ns). Each slot includes a plurality of transmission symbols in a time domain, and includes a plurality of resource blocks (RBs) in a frequency domain. A Transmission Time Interval (TTI) which is a unit time for transmission of data may be determined in units of one or more subframes. The structure of the radio frame is only exemplary and the number of subframes included in the radio frame, the number of slots included in the subframe, or the number of transmission symbols included in the slot may be variously changed.

Figure 5:
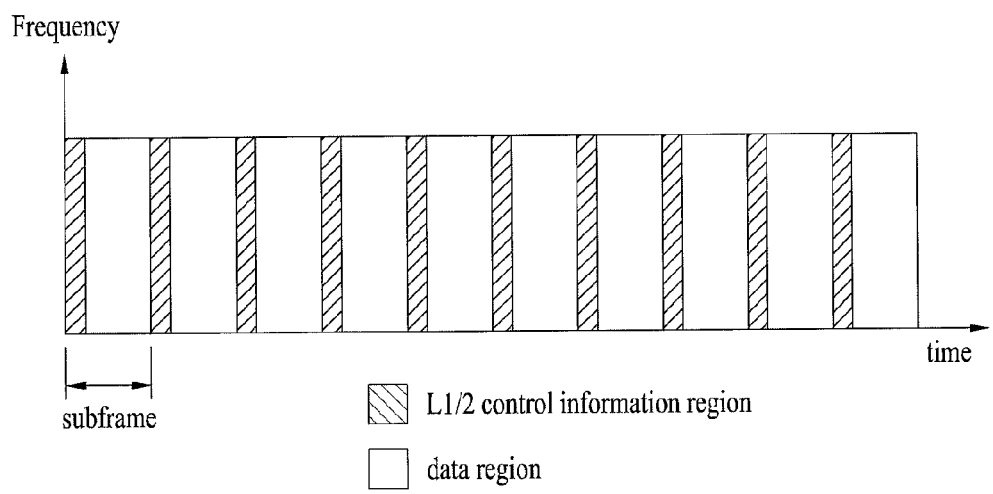
FIG. 5 is a view showing the architecture of a downlink physical channel.

FIG. 5 is a view showing the architecture of a downlink physical channel.

Referring to FIG. 5, each subframe is divided into an interval for transmitting scheduling information and other control information (control region) and an interval for transmitting downlink data (data region). The control region starts from a first OFDMA symbol of the subframe and includes one or more OFDMA symbols. The size of the control region may be independently set with respect to each subframe. Various control channels including a Physical Downlink control Channel (PDCCH) are mapped to the control region. The PDCCH is a physical downlink control channel, which is allocated within first n OFDM symbols of the subframe. The PDCCH informs UEs or a UE group of information associated with resource allocation of a Paging Channel (PCH) and a Downlink-Shared Channel (DL-SCH), uplink scheduling grant, Hybrid Automatic Repeat Request (HARQ) information, or the like. The information transmitted via the PDCCH is collectively referred to as Downlink Control Information (DCI). The PDCCH has various formats according to transmission information. The PDCCH format is also called a DCI format. For example, a DCI format 0 associated with uplink scheduling is shown in Table 1.

TABLE 1

| Field | Bits | Comment |
| --- | --- | --- |
| Format | 1 | Uplink grant or downlink assignment |
| Hopping flag | 1 | Frequency hopping on/off |
| RB assignment | 7 | — |
| MCS | 5 | — |
| . | . | . |
| . | . | . |
| . | . | . |
| RNTI/CRC | 16 | 16 bit RNTI implicitly encoded in CRC |
| Total | 38 | — |

* MCS: Modulation and Coding Scheme
* CRC: Cyclic Redundancy Check

Using a Radio Network Temporary Identifier (RNTI), it is identified to which UE the PDCCH is transmitted. For example, it is assumed that the PDCCH is CRC-masked with an RNTI "A", and uplink radio resource allocation information (e.g., frequency location) "B" and transmission format information (e.g., transmission block size, modulation scheme, coding information, or the like) "C" are transmitted via a specific subframe. In this case, a UE located in a cell monitors a PDCCH using its own RNTI information, and a UE with "A" RNTI performs uplink transmission according to information "B" and "C" obtained from the PDCCH.

Figure 6:
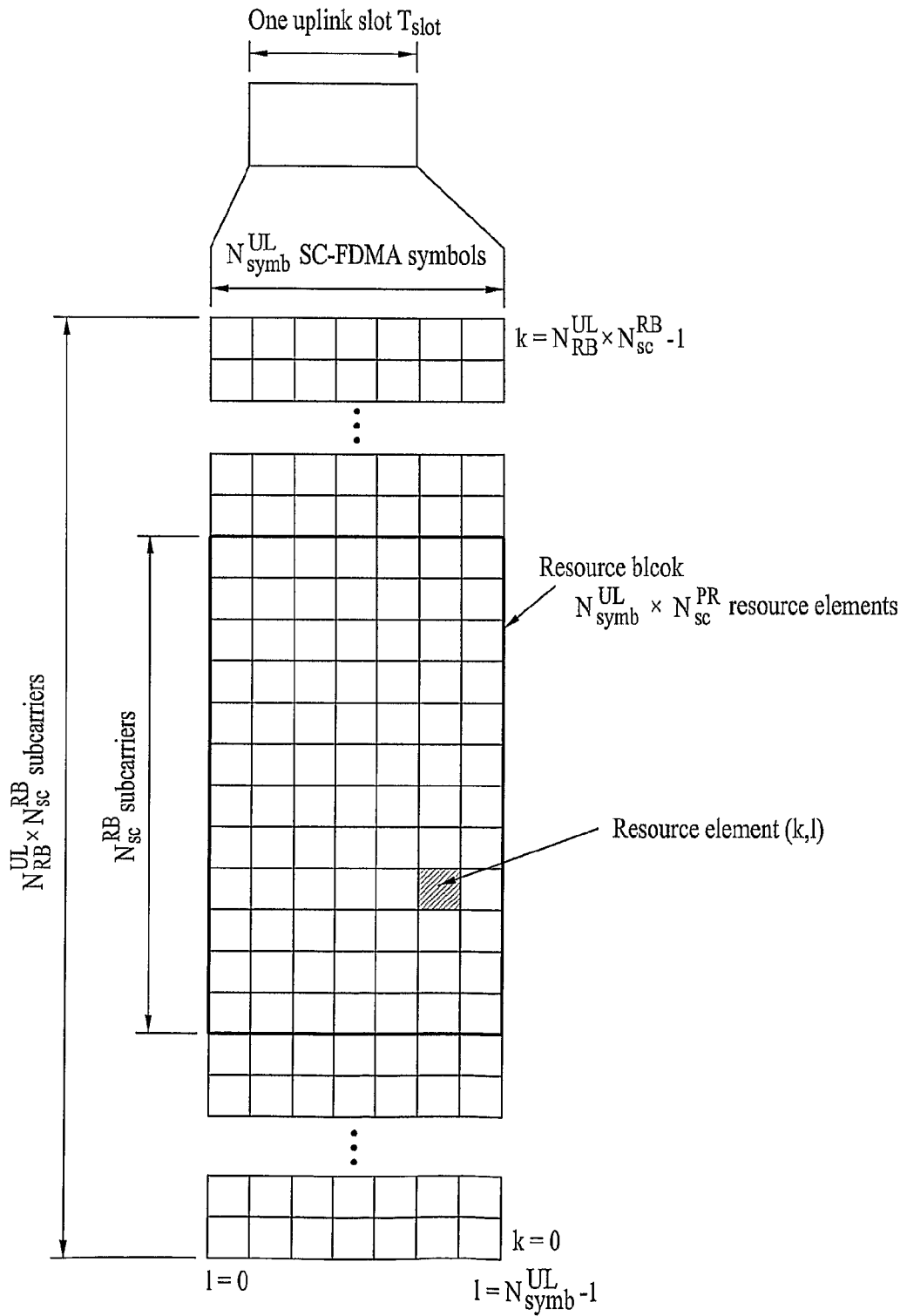
FIG. 6 is a view showing a resource grid of a slot.

FIG. 6 is a view showing a resource grid of a slot. FIG. 6 shows an uplink slot, but the resource grid is equally applicable to a downlink slot.

Referring to FIG. 6, the uplink slot includes a plurality of SC-FDMA symbols in a time domain, and includes a plurality of RBs in a frequency domain. Although, in FIG. 6, the uplink slot includes 7 SC-FDMA symbols and the RB includes 12 subcarriers, the present invention is not limited thereto. For example, the number of SC-FDMA symbols included in the uplink slot may be modified according to the length of a cyclic prefix. Elements on the resource grid are called resource elements. One RB includes 12×7 resource elements. The number $N^{UL}$ of RBs included in the uplink slot depends on an uplink transmission bandwidth set in a cell.

SC-FDMA may be subdivided according to a method for mapping frequency-domain sequences generated by DFT precoding to subcarriers. For convenience, localized SC-FDMA and clustered SC-FDMA will be described.

Figure 7A:
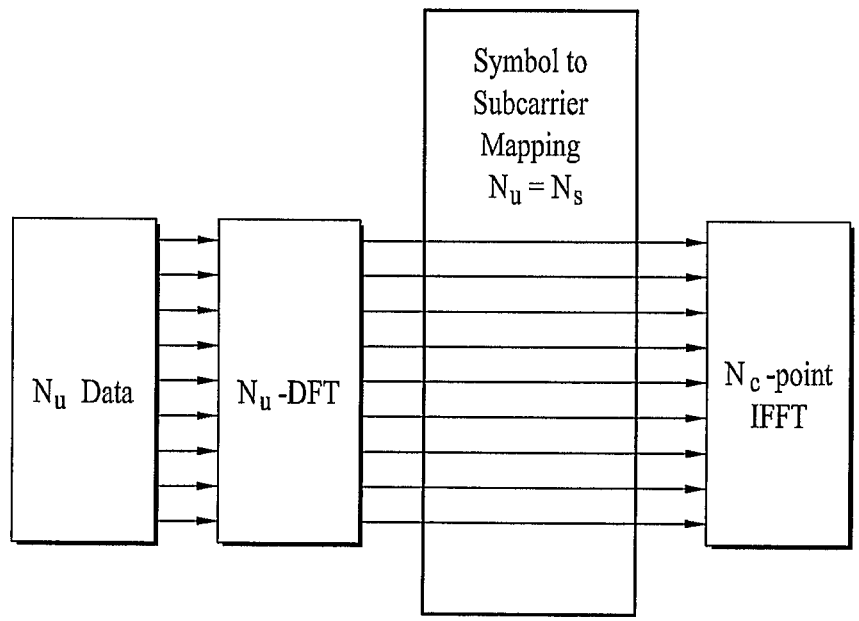
FIGS. 7A and 7B are views showing examples of localized SC-FDMA resource mapping.
Figure 7B:
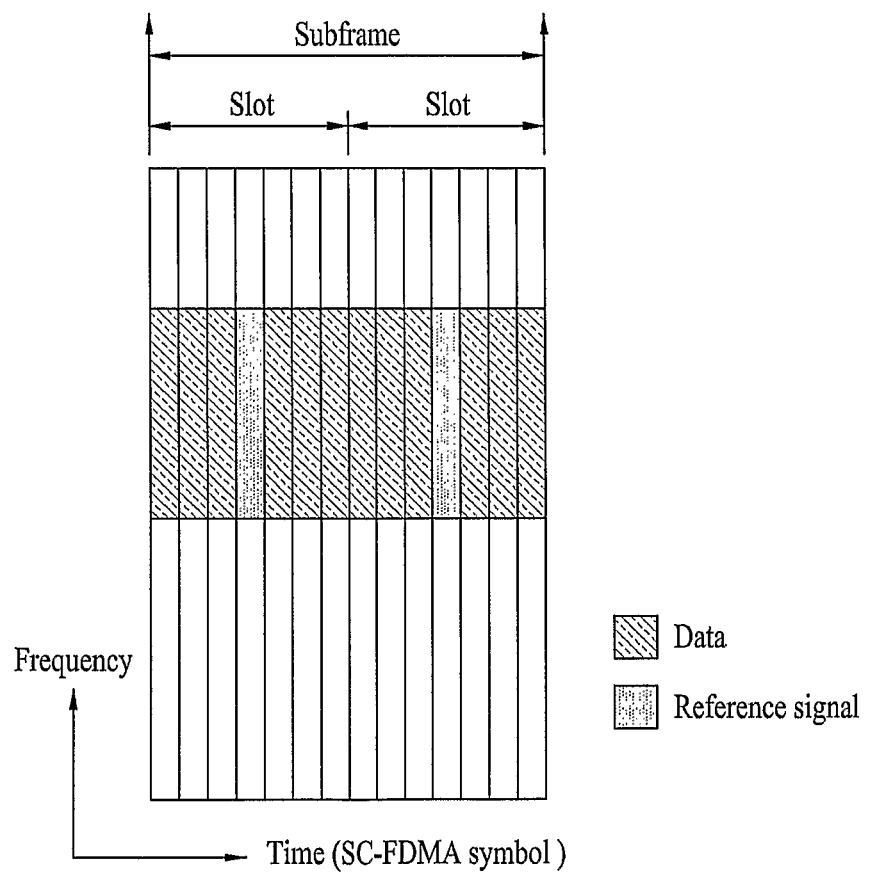

FIGS. 7A and 7B are views showing examples of localized SC-FDMA resource mapping. The localized SC-FDMA may also be called Localized FDMA (LFDMA), Narrowband FDMA, Classical FDMA, and FDMA.

Referring to FIG. 7A, $N_u$ data symbols are input to an $N_u$-DFT module. Here, $N_u$ denotes the number of subcarriers scheduled at a given time point. The $N_u$-DFT module generates frequency-domain sequences with a length of $N_u$, which are spread in the frequency domain, from the $N_u$ data symbols. The frequency-domain sequences output from the $N_u$-DFT module are continuously allocated to $N_u$ subcarriers of a system band ($N_c$ subcarriers) by a subcarrier mapping process. Thereafter, the localized SC-FDMA symbols are generated by an $N_c$-point IFFT module.

Referring to FIG. 7B, an uplink subframe includes two slots. Each of the slots includes 6 or 7 localized SC-FDMA symbols according to the CP length. Each of the localized SC-FDMA symbols includes a plurality of continuous data subcarriers. Since the localized SC-FDMA symbol has a single carrier characteristic on a time axis, a PAPR is smaller than that of an OFDMA symbol. In addition, the localized SC-FDMA scheme can perform frequency selective scheduling. However, in the localized SC-FDMA scheme, since data can be transmitted only via continuous subcarriers at a given time point, scheduling flexibility may deteriorate. For example, if a transmitter and a receiver have good radio channel response characteristics in a plurality of frequency domains, which are separated from each other, at any time point, data cannot be simultaneously transmitted via the frequency domains which are separated from each other.

Figure 8A:
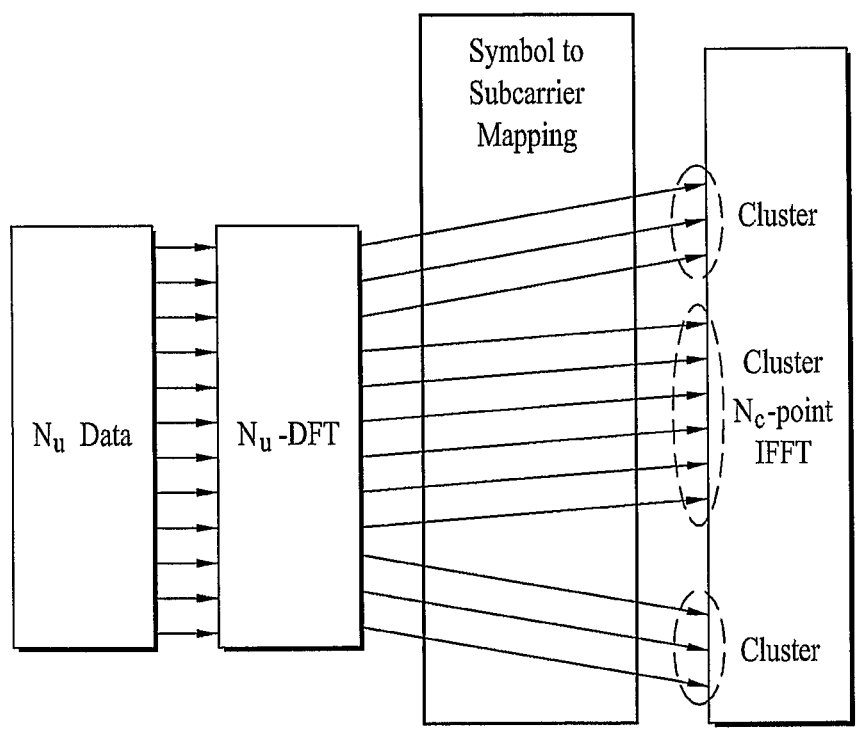
FIGS. 8A and 8B are views showing examples of clustered SC-FDMA resource mapping.
Figure 8B:
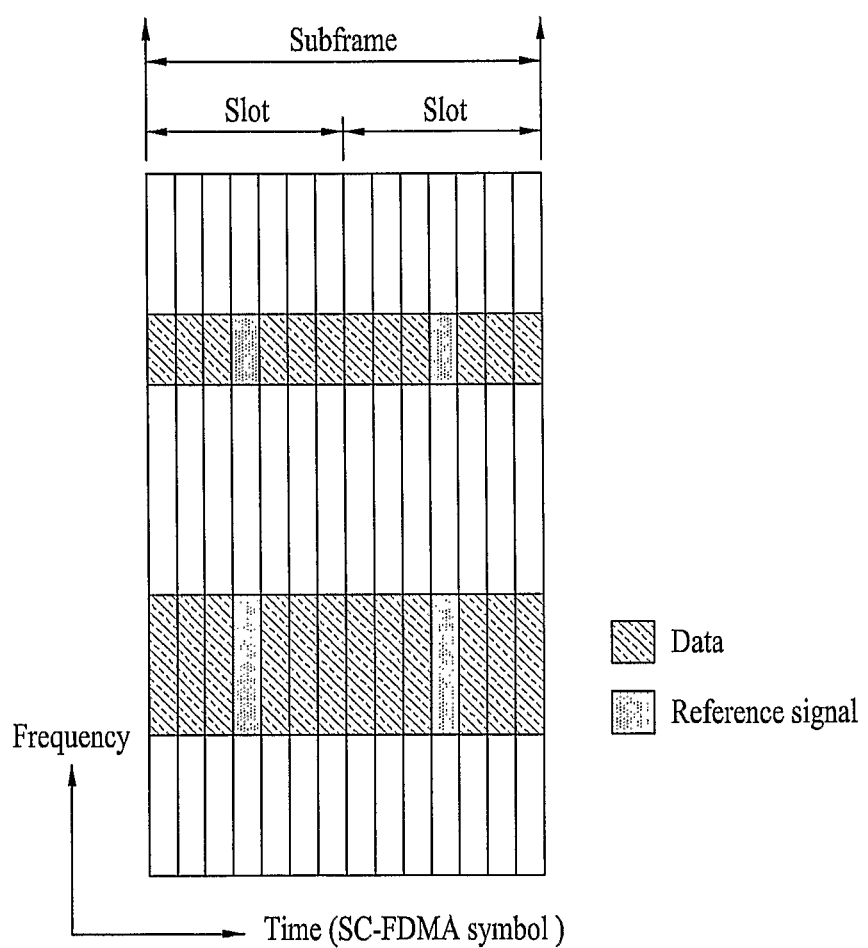

FIGS. 8A and 8B are views showing examples of clustered SC-FDMA resource mapping.

Referring to FIG. 8A, $N_u$ data symbols are input to an $N_u$-DFT module. Here, $N_u$ denotes the number of subcarriers scheduled at a given time point. The $N_u$-DFT module generates frequency-domain sequences with a length of $N_u$, which are spread in the frequency domain, from the $N_u$ data symbols. The frequency-domain sequences output from the $N_u$-DFT module are allocated to one or more clusters set within a system band ($N_c$ subcarriers) by a subcarrier mapping process. The cluster indicates a frequency band to which the localized SC-FDMA scheme is applied. Each of the clusters includes one or more continuous subcarriers. Accordingly, the data symbols are discontinuously mapped to a plurality of clusters in a frequency domain, and are continuously mapped to one or more subcarriers within each of the clusters. Thereafter, clustered SC-FDMA symbols may be generated by an $N_c$-point IFFT module.

Referring to FIG. 8B, an uplink subframe includes two slots. Each of the slots includes 6 or 7 clustered SC-FDMA symbols according to the CP length. Each of the clustered SC-FDMA symbols includes one or more discontinuous clusters, and each of the clusters includes one or more continuous subcarriers. FIG. 8B shows the case where the number of clusters is 2. The sizes of the clusters (e.g., the number of subcarriers) are equally or independently set. In the clustered SC-FDMA symbols, since a single carrier characteristic is broken on a time axis, a PAPR is slightly increased. However, if the number of clusters is set in a proper range, it is possible to improve scheduling flexibility while securing a smaller PAPR than the OFDMA scheme.

Definition and Classification of MIMO Technology

MIMO technology refers to technology for performing communication using multiple transmission antennas and/or multiple reception antennas. The MIMO technology can remarkably improve communication capacity and transmission or reception performance without additional frequency allocation or increase in power. Accordingly, the MIMO technology is attracting much attention as next-generation technology for solving the limit in transmission amount of mobile communication, due to data communication expansion or the like. The MIMO technology may be widely used in UEs and relay nodes.

Figure 9:
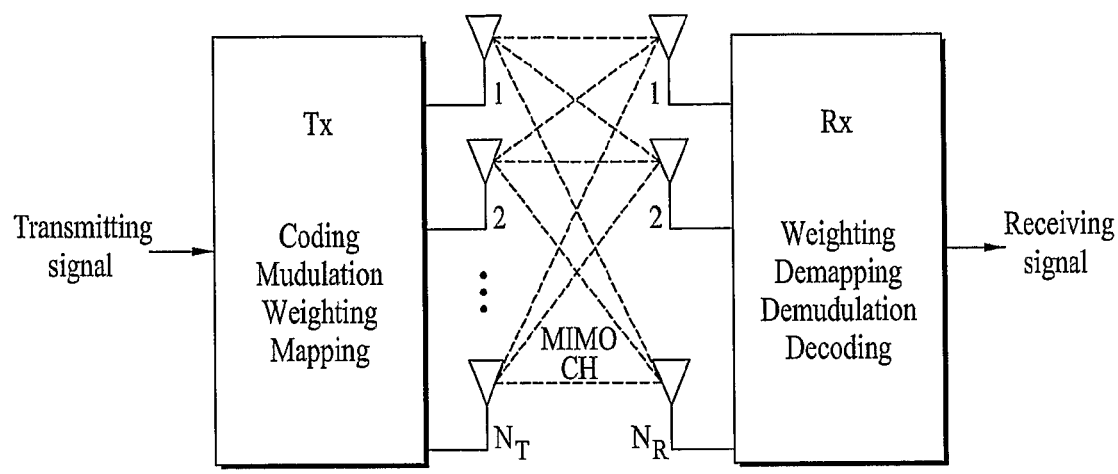
FIG. 9 is a view showing the configuration example of a radio communication system using multiple antennas.

FIG. 9 is a view showing the configuration example of a radio communication system using multiple antennas. As shown in FIG. 9, if the number of transmission antennas is increased to $N_T$ and the number of reception antennas is increased to $N_R$, a theoretical channel transmission capacity is increased in proportion to the number of antennas, unlike the case where a plurality of antennas is used only in the transmitter or the receiver. Accordingly, it is possible to improve a transfer rate and remarkably improve frequency efficiency.

When focusing on research associated with multiple antennas, various research such as information theory associated with MIMO communication capacity computation in various channel environments and multiple access environments, research on radio channel measurement and model derivation of the MIMO system, and space-time signal processing technology for improving a transfer rate and improving transmission reliability have been conducted.

The MIMO technology includes a spatial diversity scheme for increasing transmission reliability using symbols passing through various channel paths and a spatial multiplexing scheme for simultaneously transmitting a plurality of data symbols using a plurality of transmission antennas so as to improve transfer rate. Recently, research into a proper combination of the two schemes for obtaining the respective advantages of the schemes is ongoing. Each of the schemes will be described in more detail.

First, the spatial diversity scheme includes a space-time block coded scheme and a space-time trellis coded scheme simultaneously using a diversity gain and a coding gain. In general, the space-time trellis coded scheme is excellent in terms of bit error rate improvement performance and degree of freedom in code generation, but the space-time block coded scheme is simple in terms of computation complexity. The spatial diversity gain is an amount corresponding to a product of the number of transmission antennas and the number of reception antennas.

Second, in the spatial multiplexing scheme, different data streams are transmitted via respective transmission antennas. At this time, since interference is generated between data simultaneously transmitted from the transmitter, the receiver detects a signal after eliminating the interference using a proper signal processing scheme. Examples of the interference eliminating scheme include a Maximum Likelihood (ML) scheme, a Zero Forcing (ZF) scheme, a Minimum Mean Square Error (MMSE) scheme, a Diagonal Bell laboratories Layered Space-Time (D-BLAST) scheme, a Vertical Bell laboratories Layered Space-Time (V-BLAST) scheme, and the like. If the transmitter can have channel information, a Singular Value Decomposition (SVD) scheme or the like may be used.

Third, a hybrid scheme of the spatial diversity scheme and the spatial multiplexing scheme may be used. If only the spatial diversity gain is obtained, a performance improvement gain according to the increase in diversity order is gradually saturated and, if only a spatial multiplexing gain is obtained, transmission reliability is reduced in a radio channel. Such a hybrid scheme includes a Double-Space Time Transmit Diversity (D-STTD) scheme, a Space Time Bit-Interleaved Coded modulation (STBICM) scheme, and the like.

Modeling of MIMO System

The MIMO system will be described using mathematical modeling in more detail. It is assumed that $N_T$ transmission antennas and $N_R$ reception antennas are present in the system.

In a transmitted signal, if $N_T$ transmission antennas are present, the maximum number of transmittable information is $N_T$. The transmission information may be expressed as follows.

$$S=[S_1, S_2, \ldots, S_{N_T}]^T \quad \text{Equation 2}$$

The transmission information $S_1, S_2, \ldots, S_{N_T}$ may have different transmission powers. If the transmission powers are $P_1, P_2, \ldots, P_{N_T}$, the transmission information with adjusted transmission powers may be expressed as follows.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{Equation 3}$$

In addition, $\hat{S}$ may be expressed using a diagonal matrix $P$ of the transmission powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

The case where a weighting matrix $W$ is applied to an information vector $\hat{S}$ with adjusted transmission powers such that $N_T$ transmitted signals $x_1, x_2, \ldots, x_{N_T}$ are configured will be considered. The weighting matrix $W$ serves to properly distribute the transmission information to the antennas according to transmission channel states. $x_1, x_2, \ldots, x_{N_T}$ may be expressed using a vector $X$ as follows.

$$X = \begin{bmatrix} x_1 \\ x_2 \\ \vdots \\ x_i \\ \vdots \\ x_{N_T} \end{bmatrix} \quad \text{Equation 5}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Here, $w_{ij}$ denotes weighting between an $i^{th}$ transmission antenna and $j^{th}$ information. $W$ is also called a precoding matrix.

Now, the case where signals are transmitted using the spatial diversity scheme and the case where signals are transmitted using the spatial multiplexing scheme will be described. In the spatial multiplexing scheme, since different signals are transmitted in a state of being multiplexed, all the elements of the information vector $\hat{S}$ have different values. In contrast, in the spatial diversity scheme, since the same signal is transmitted via several channel paths, all the elements of the information vector $\hat{S}$ have the same value. A method for mixing the spatial multiplexing scheme and the spatial diversity scheme may be considered. For example, the same signal may be transmitted via three transmission antennas and different signals may be respectively transmitted via the residual transmission antennas.

Meanwhile, if $N_R$ reception antennas are present, received signals $y_1, y_2, \ldots, y_{N_R}$ of the antennas may be expressed as follows.

$$y=[y_1, y_2, \ldots, y_{N_R}]^T \quad \text{Equation 6}$$

Figure 10:
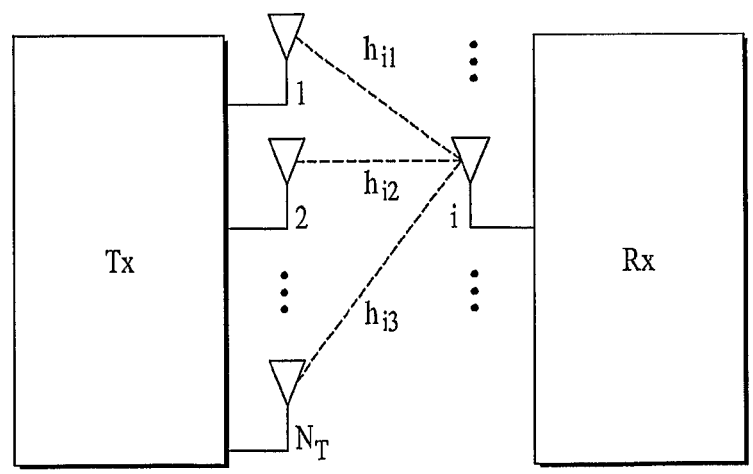
FIG. 10 is a view showing channels from $N_T$ transmission antennas to a reception antenna i.

FIG. 10 is a view showing channels from $N_T$ transmission antennas to a reception antenna i. Channels may be distinguished according to transmission or reception antenna indexes. A channel from a transmission antenna j to a reception antenna i is denoted by $h_{ij}$. In $h_{ij}$, it is noted that a reception antenna index is first described and a transmission antenna index is described next. The channels may be combined and expressed in the form of a vector or a matrix. The channels from a total of $N_T$ transmission antennas to the reception antenna i may be expressed as follows.

$$h_i^T=[h_{i1}, h_{i2}, \ldots, h_{iN_T}] \quad \text{Equation 7}$$

Accordingly, all the channels from $N_T$ transmission antennas to $N_R$ reception antenna may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{Equation 8}$$

Additive White Gaussian Noise (AWGN) is added to an actual channel after being subjected to a channel matrix $H$. AWGN $n_1, n_2, \ldots, n_{N_R}$ added to the $N_R$ reception antennas may be expressed as follows.

$$n=[n_1, n_2, \ldots, n_{N_R}]^T \quad \text{Equation 9}$$

By the above-described mathematical modeling, the received signal may be expressed as follows.

$$y = \begin{bmatrix} y_1 \\ y_2 \\ \vdots \\ y_i \\ \vdots \\ y_{N_R} \end{bmatrix} \quad \text{Equation 10}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

$$= HWPs + n$$

$$= \tilde{H}s + n$$

Meanwhile, the rank of the matrix is defined by a minimum number of independent rows or columns. Accordingly, the rank rank(H) of the channel matrix H is restricted as follows.

$$\text{rank}(H) \leq \min(N_T, N_R) \quad \text{Equation 11}$$

The rank may be defined by the number of Eigen values excluding 0, when the matrix is subjected Eigen value decomposition. Similarly, the rank may be defined by the number of singular values excluding 0, when singular value decomposition is performed. Accordingly, the physical meaning of the rank in the channel matrix is a maximum number of different information, which can be transmitted via a given channel.

Figure 11:
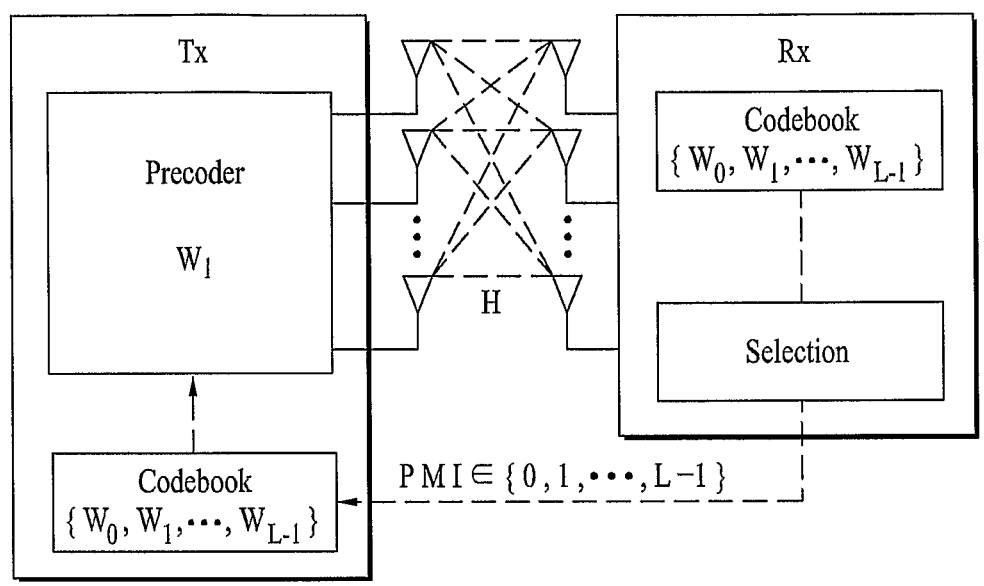
FIG. 11 is a view showing an example of communication performed in a Multiple-Input Multiple-Output (MIMO) system.

FIG. 11 is a view showing an example of communication performed in an MIMO system.

Referring to FIG. 11, a transmitter and a receiver share a codebook for applying the MIMO technology. The codebook refers to a set of precoding matrices or vectors which is previously defined. The precoding matrix has a size of $N_T \times N_L$. $N_T$ denotes the number of antennas used for signal transmission, and $N_L$ denotes the number of layers. The number of layers may be determined according to the rank of the channel matrix. The precoding matrix may be configured in a nested format. Meanwhile, if two antenna ports are used in LTE, the codebook is defined as shown in Table 2. If four antenna ports are used, the codebook may refer to 3GPP TS36.211.

TABLE 2

| Codebook index | Number of layers υ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

For convenience, it is assumed that, in FIG. 11, the transmitter and the receiver share a codebook including $W_i \epsilon \{W_0, W_1, \ldots, W_{L-1}\}$. The transmitter selects a precoding matrix from the codebook randomly or based on a predetermined criterion. Thereafter, the transmitter transmits the signal processed using the precoding matrix to the receiver via multiple antennas. The receiver inversely processes the received signal using the precoding matrix in the codebook. In this process, the receiver may select a suitable precoding matrix in consideration of an MIMO channel state. In this case, the receiver may feed back an indicator for a specific precoding matrix in the codebook to the transmitter. The indicator for the precoding matrix is called a Precoding Matrix Indicator (PMI) (PMI$\epsilon\{0, 1, \ldots, L-1\}$). In the case of Table 2, the codebook index may correspond to the PMI. The transmitter may perform communication using the precoding matrix indicated by the PMI, after receiving the PMI from the receiver.

SC-FDMA Transmitter for Supporting Multiple Antennas

In the LTE, the MIMO technology is used in downlink transmission, but is not considered in uplink transmission for various reasons. However, in the LTE-A, there is a need for signal transmission via multiple antennas in uplink, in order to maximize the use of frequency resources and satisfy demand for high-speed communication.

Figure 12:
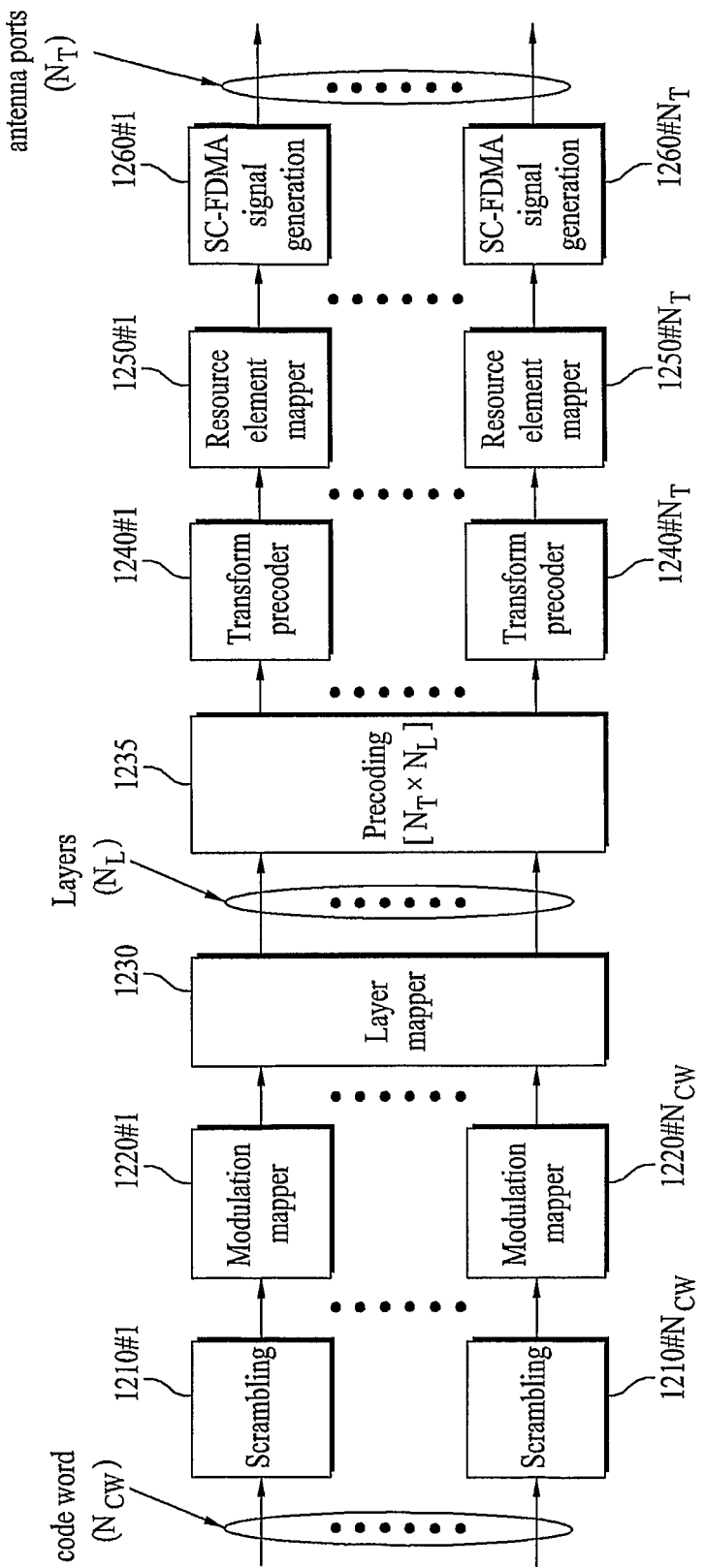
FIGS. 12 to 14 are exemplary views of an SC-FDMA transmitter for supporting multiple antennas.

FIG. 12 is a view showing an example of an SC-FDMA transmitter for supporting multiple antennas.

Referring to FIG. 12, scrambling module 1210#1 to 1210#$N_{CW}$ may scramble $N_{CW}$ codewords (CW) using specific scrambling codes/sequences of a UE. The $N_{CW}$ scrambled signals are input to modulation mappers 1220#1 to 1220#$N_{CW}$ so as to be modulated to complex symbols by a BPSK, QPSK, 16QAM or similar scheme according to the kinds of the transmitted signals and/or the channel states. Thereafter, the $N_{CW}$ modulated complex symbols are mapped to $N_L$ layers by a layer mapper 1230. A precoder 1235 maps $N_L$ layers to $N_T$ streams corresponding to the antenna ports using precoding vectors/matrices. Accordingly, the precoding vectors/matrices are multiplied by time-axis signals. The precoding vector/matrix may be selected randomly or by a predetermined criterion. In addition, the precoding vector/matrix may be selected using the PMI received from the receiver. The streams are processed by transform precoders 1240#1 to 1240#$N_T$ and are then input to resource element mappers 1250#1 to 1250#$N_T$. Thereafter, the signals mapped to the subcarriers are delivered to the antenna ports via SC-FDMA signal generators 1260#1 to 1260#$N_T$. The antenna ports are mapped to physical antennas by antenna virtualization.

Figure 13:
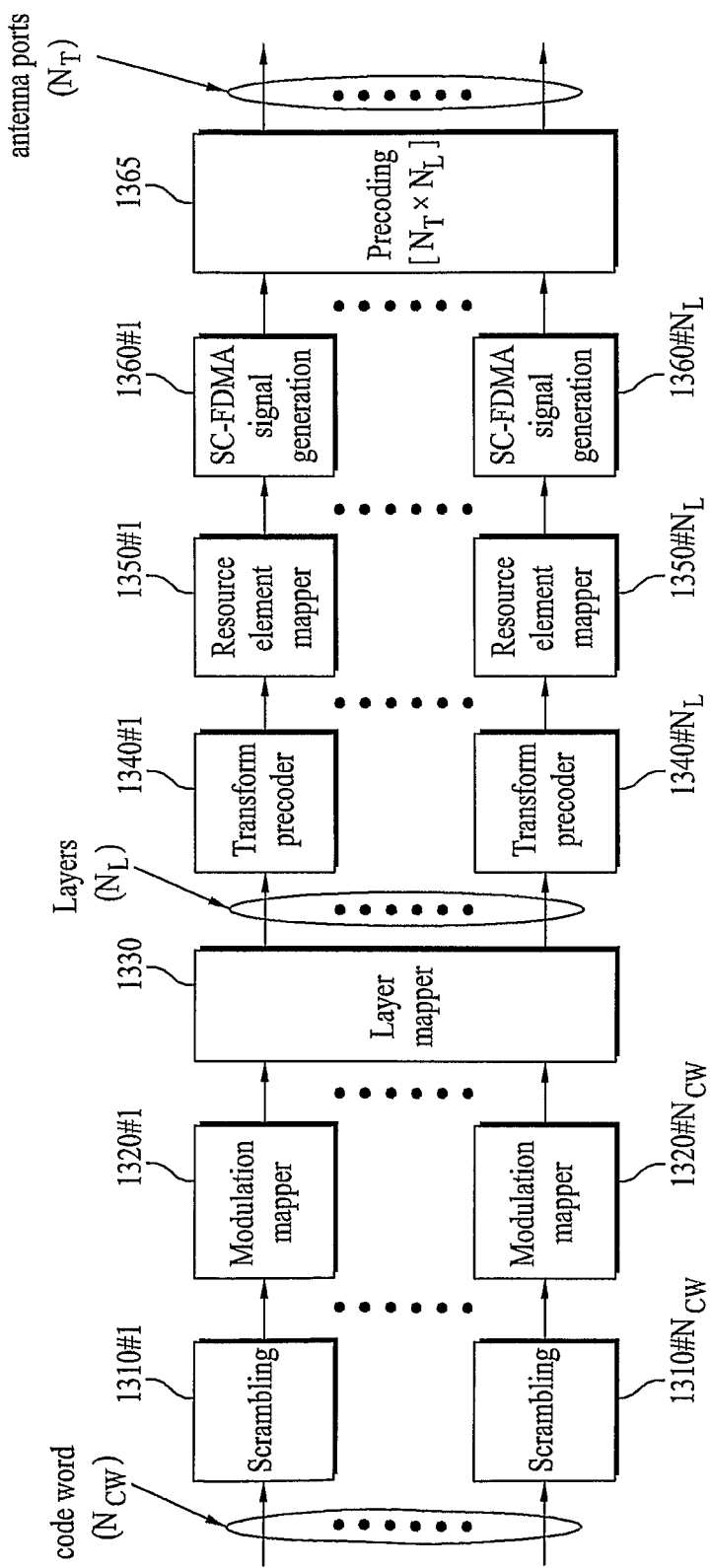

FIG. 13 is a view showing another example of an SC-FDMA transmitter for supporting multiple antennas.

FIG. 13 is equal to FIG. 12 except that a precoder 1365 is added next to the SC-FDMA signal generators 1360#1 to 1360#$N_T$. Accordingly, the precoding vectors/matrices are multiplied by SC-FDMA symbols which are time-axis signals.

Figure 14:
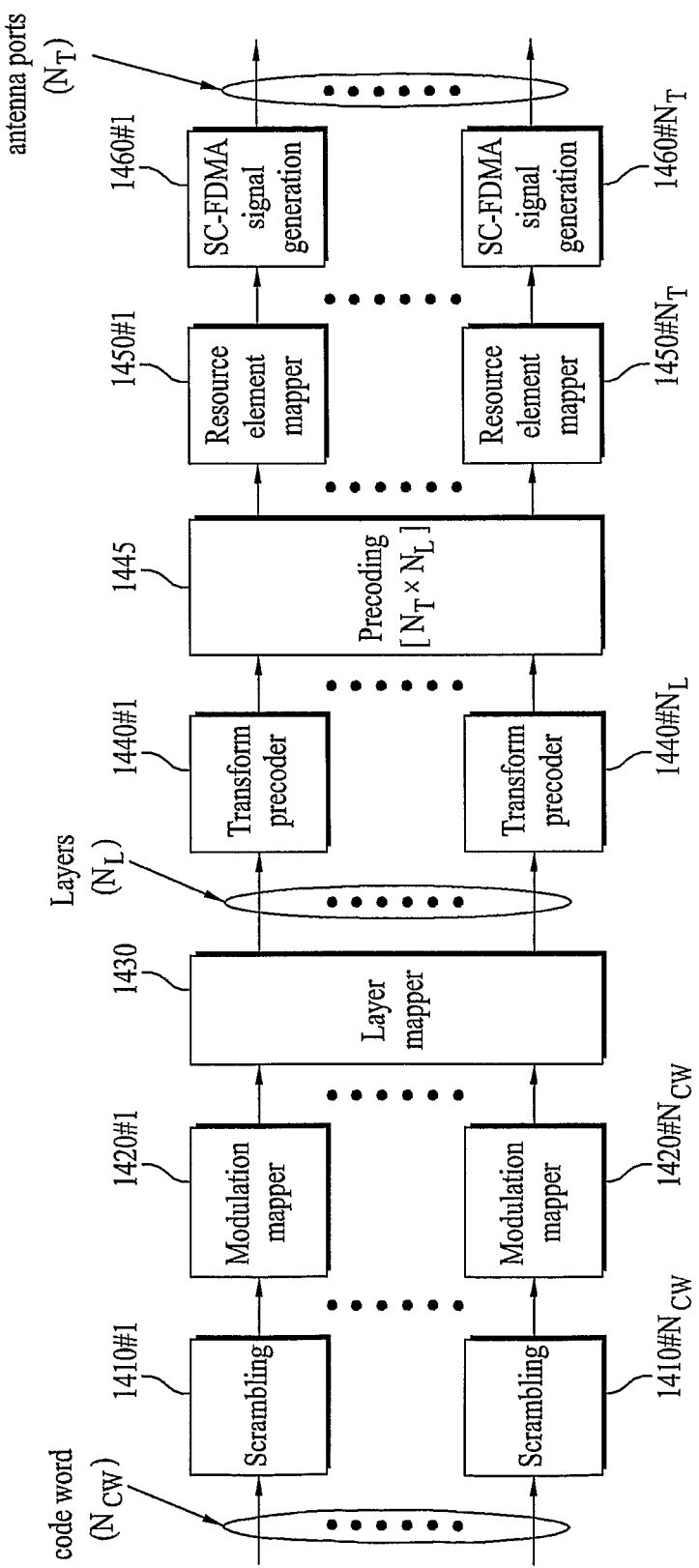

FIG. 14 is a view showing another example of an SC-FDMA transmitter for supporting multiple antennas.

FIG. 14 is equal to FIG. 12 except that a precoder 1445 is added next to the transform precoders 1440#1 to 1440#$N_T$. Accordingly, the precoding vectors/matrices are multiplied per each subcarrier in a frequency axis after performing a DFT process, and the precoded outputs are subjected to an IFFT process so as to generate SC-FDMA symbols.

In summary, in FIGS. 12 and 13, the precoding matrices are multiplied by time-domain signals. In contrast, in FIG. 14, the precoding matrices are multiplied by frequency-domain signals. Accordingly, if the precoding matrix multiplied by each subcarrier is the same in FIG. 14, the systems shown in FIGS. 12 to 14 are equivalent. However, in FIG. 14, since the precoding matrices are multiplied in the frequency domain, optimal precoding matrices are applicable according to subcarrier bands. However, if the precoding matrices multiplied by the subcarriers are differently applied according to subcarriers, the single carrier characteristic of the SC-FDMA is broken and thus the PAPR can be increased.

Channel Variation in Frequency Axis of Wideband System

Figure 15:
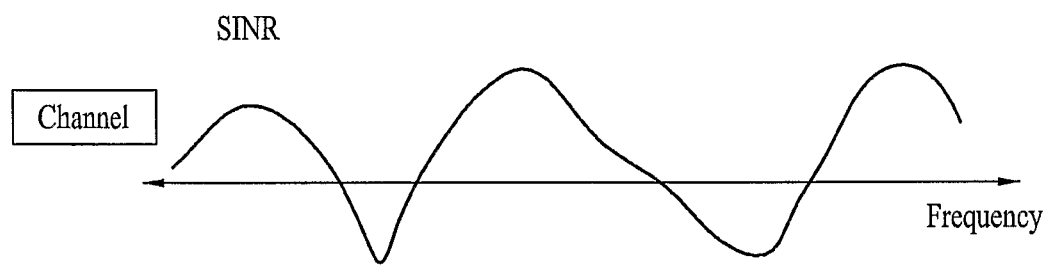
FIG. 15 is a view showing channel variation in a frequency axis in a wideband system.

FIG. 15 is a view showing channel variation in a frequency axis in a wideband system.

Referring to FIG. 15, if a system bandwidth is larger than a coherence bandwidth, the channel may rapidly vary within the system bandwidth. Accordingly, an optimal precoding matrix for the bandwidth also varies. Meanwhile, in the SC-FDMA scheme, since a plurality of subcarriers is included in a given band and modulated symbols are transmitted via the subcarriers, it is possible to apply an optimal precoding matrix in a frequency axis.

Figure 16:
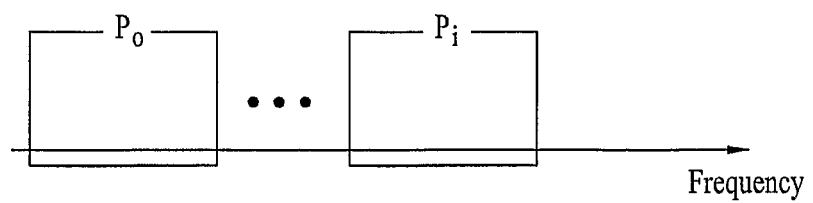
FIG. 16 is a view showing an example of applying a precoding matrix in a frequency axis in an SC-FDMA scheme.

FIG. 16 is a view showing an example of applying a precoding matrix in a frequency axis in the SC-FDMA scheme.

Referring to FIG. 16, one precoding matrix may be equally applied to a predetermined resource unit. The predetermined resource unit includes a system band, a subband, a cluster, or a subcarrier. Here, the system band is divided into a plurality of subbands, and the subbands may have the same size or different sizes. The number or the size of subbands may be fixed or semi-statically changed. Each of the subbands includes one or more continuous subcarriers. In addition, the cluster is a resource unit allocated from an eNode B to a UE by scheduling, and includes one or more continuous subcarriers. One or more clusters may be allocated to the UE via uplink grant. The clusters are discontinuously located within a frequency band, and the sizes of the clusters are independently set according to the scheduled result. Meanwhile, in SC-FDMA transmission, since the frequency-domain signals are spread in a wide band by a DFT process and the channel gains of the subcarriers are changed by frequency selectivity, it is difficult to achieve performance improvement if one precoding matrix is applied to the system band. In contrast, if an optimal precoding matrix is applied to each of the subcarriers, signaling overhead may be excessively large.

Figure 17A:
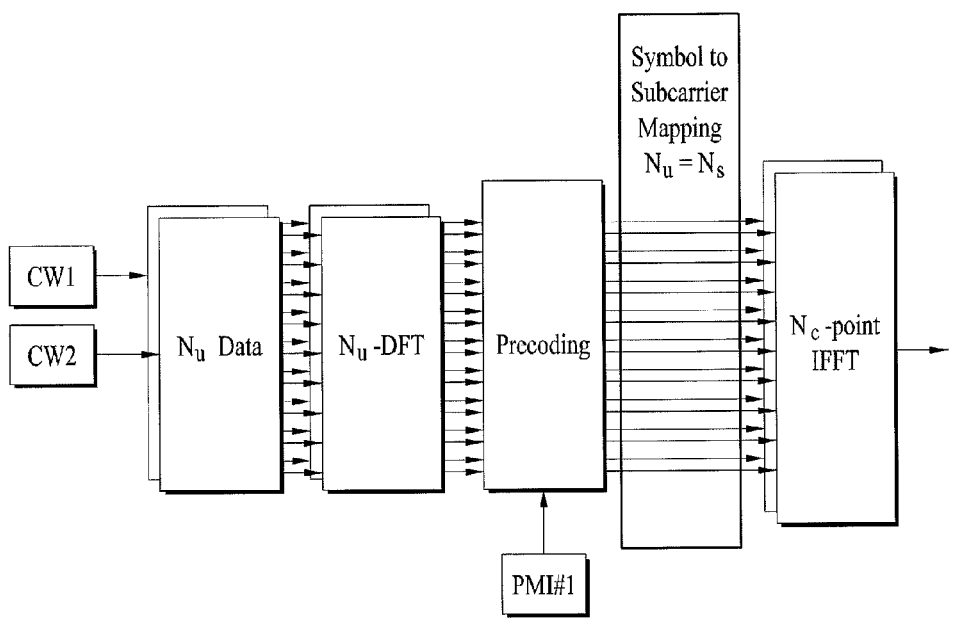
FIGS. 17A to 17C are views showing examples of applying a precoding matrix to an SC-FDMA transmitter.
Figure 17B:
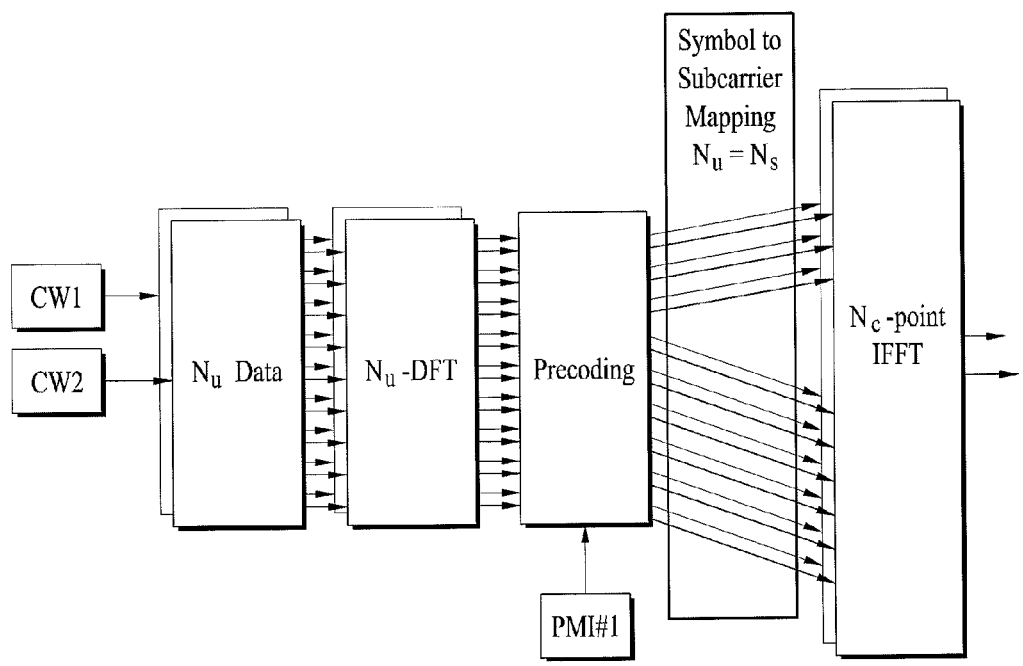
Figure 17C:
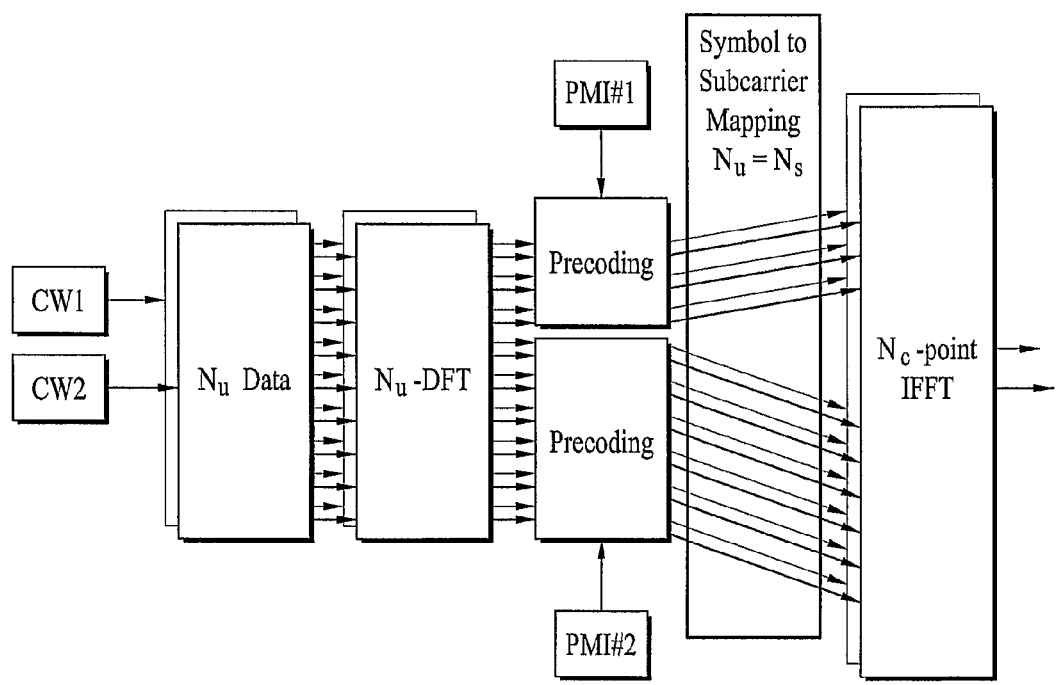

FIGS. 17A to 17C are views showing examples of applying a precoding matrix to an SC-FDMA transmitter. The present embodiment will be described using the SC-FDMA transmitter of FIG. 14, for convenience. For convenience of description, it is assumed that the SC-FDMA transmitter has two transmission antennas.

Referring to FIG. 17A, a codeword 1 (CW1) and a codeword (CW2) are respectively transformed to frequency-domain sequences by a DFT module. The precoding module maps the two frequency-domain sequences to two streams corresponding to transmission antennas using a precoding matrix corresponding to PMI#1. Thereafter, the precoded frequency-domain sequences are continuously mapped to subcarriers within the frequency band by a subcarrier mapping module. That is, the codewords are continuously mapped to a plurality of subcarriers by the localized SC-FDMA scheme, and the precoding matrices applied to the subcarriers are the same. Accordingly, since the single carrier characteristic is maintained, a low PAPR value can be maintained. However, if the channel state is changed within the scheduled band, system performance may deteriorate. In contrast, if precoding matrices are differently applied to subcarriers, the single carrier characteristic is broken and thus a PAPR is increased.

Referring to FIG. 17B, a codeword 1 (CW1) and a codeword 2 (CW2) are respectively transformed into frequency-domain sequences by a DFT module. The precoding module maps the two frequency-domain sequences to two streams corresponding to transmission antennas using a precoding matrix corresponding to PMI#1. Thereafter, the precoded frequency-domain sequences are mapped to clusters within the frequency band by a subcarrier mapping module. That is, the codewords are discontinuously mapped within the frequency band by the clustered SC-FDMA scheme, but the precoding matrices applied to the subcarriers are the same regardless of the clusters. In this case, the single carrier characteristic is broken due to the discontinuous subcarrier mapping such that the PAPR is slightly increased, but flexible scheduling can be supported.

If the channel state is changed according to clusters, system performance may deteriorate.

Referring to FIG. 17C, a codeword 1 (CW1) and a codeword 2 (CW2) are respectively transformed to frequency-domain sequences by a DFT module. The precoding module maps the two frequency-domain sequences to two streams corresponding to transmission antennas using precoding matrices corresponding to PMI#1 and PMI#2 according to clusters. PM1#1 and PMI#2 are independent of each other and thus may be equal or different. Thereafter, the precoded frequency-domain sequences are mapped to clusters within the frequency band by a subcarrier mapping module. That is, the codewords are discontinuously mapped within the frequency band by the clustered SC-FDMA scheme. In addition, the precoding matrices applied to the subcarriers are independently determined according to clusters. That is, the same precoding matrix is applied to the subcarriers in a cluster. In this case, flexible scheduling can be supported by the discontinuous subcarrier mapping. In addition, since an optimal precoding matrix is applied according to clusters, it is possible to guarantee optimal system performance even when a channel gain is changed in the frequency axis. For reference, in the localized SC-FDMA scheme, if the precoding matrices are differently applied to the scheduled subcarriers, a single carrier characteristic is broken and thus the PAPR characteristic deteriorates. However, in the clustered SC-FDMA scheme, since a single carrier characteristic is already broken due to discontinuity between clusters, the PAPR is no longer increased even when the precoding matrices are differently applied according to clusters. If the precoding matrices are differently applied within a cluster, the PAPR may be further increased.

For convenience, in the above description, it is assumed that two codewords are mapped to two independent data streams by the precoding process when the number of transmission antennas is two. However, the above description is only exemplary and the embodiment of the present invention is applicable to the case where one or more codewords are mapped to one or more independent data streams by the precoding process when the number of antennas is two or more.

Simulation Result

Simulation was performed with respect to the examples of FIGS. 17A to 17C. That is, simulation was performed with respect to the case where one precoding matrix (PM) is applied to the whole bandwidth (WB) and the case where the precoding matrices are applied according to clusters. For reference, simulation was performed with respect to the case where the precoding matrices are differently applied within a cluster. Results are shown in Table 3.

TABLE 3

| | | | w/o PSF | | | | | | | |
|---|---|---|---|---|---|---|---|---|---|---|
| | | | 99.9% PAPR | | | | CM | | | |
| | | | QPSK | | | | | | | |
| | | | Clustered-SC-FDMA | | | | Clustered-SC-FDMA | | | |
| | | #Cluster | 1 | 2 | 3 | 4 | 1 | 2 | 3 | 4 |
| 2 RBs | PM | 1Tx | 5.77 | 6.19 | 6.68 | 6.99 | 1.20 | 1.96 | 2.51 | 2.82 |
| per | per | ANT1 | 6.65 | 7.14 | 7.47 | 7.64 | 2.53 | 2.96 | 3.25 | 3.42 |
| Cluster | Cluster | ANT2 | 6.61 | 7.07 | 7.44 | 7.63 | 2.51 | 2.94 | 3.23 | 3.41 |
| | PM | 1Tx | 5.81 | 6.21 | 6.64 | 7.00 | 1.23 | 1.97 | 2.50 | 2.82 |
| | per | ANT1 | 6.67 | 7.04 | 7.46 | 7.62 | 2.52 | 2.92 | 3.24 | 3.39 |
| | WB | ANT2 | 6.65 | 7.04 | 7.44 | 7.62 | 2.61 | 2.92 | 3.23 | 3.41 |

TABLE 3-continued

|  |  |  | w/o PSF | | | | | | | |
|---|---|---|---|---|---|---|---|---|---|---|
|  |  |  | 99.9% PAPR | | | | CM | | | |
|  |  |  | QPSK | | | | | | | |
|  |  |  | Clustered-SC-FDMA | | | | Clustered-SC-FDMA | | | |
|  |  | #Cluster | 1 | 2 | 3 | 4 | 1 | 2 | 3 | 4 |
| 4 RBs per Cluster | PM per Cluster | 1Tx | 5.82 | 6.21 | 6.68 | 6.98 | 1.22 | 1.96 | 2.51 | 2.82 |
|  |  | ANT1 | 6.82 | 7.14 | 7.46 | 7.65 | 2.52 | 2.92 | 3.24 | 3.39 |
|  |  | ANT2 | 6.74 | 7.08 | 7.44 | 7.64 | 2.53 | 2.93 | 3.24 | 3.40 |
|  | PM per WB | 1Tx | 5.77 | 6.23 | 6.66 | 6.99 | 1.21 | 1.97 | 2.51 | 2.83 |
|  |  | ANT1 | 6.77 | 7.12 | 7.46 | 7.64 | 2.56 | 2.95 | 3.25 | 3.40 |
|  |  | ANT2 | 6.76 | 7.11 | 7.46 | 7.64 | 2.54 | 2.95 | 3.23 | 3.40 |
| 8 RBs per Cluster | PM per Cluster | 1Tx | 5.82 | 6.20 | 6.69 | 7.00 | 1.22 | 1.96 | 2.52 | 2.83 |
|  |  | ANT1 | 6.79 | 7.12 | 7.45 | 7.63 | 2.56 | 2.94 | 3.23 | 3.41 |
|  |  | ANT2 | 6.79 | 7.12 | 7.46 | 7.64 | 2.55 | 2.95 | 3.24 | 3.41 |
|  | PM per WB | 1Tx | 5.79 | 6.21 | 6.68 | 7.00 | 1.22 | 1.97 | 2.51 | 2.84 |
|  |  | ANT1 | 6.7 | 7.15 | 7.46 | 7.64 | 2.54 | 2.95 | 3.24 | 3.41 |
|  |  | ANT2 | 6.8 | 7.12 | 7.44 | 7.63 | 2.57 | 2.95 | 3.23 | 3.40 |
|  | 2 PMs per Cluster | 1Tx | 5.83 | 6.23 | 6.71 | — | 1.23 | 1.97 | 2.53 | — |
|  |  | ANT1 | 6.76 | 7.11 | 7.45 | — | 2.55 | 2.94 | 3.24 | — |
|  |  | ANT2 | 6.98 | 7.41 | 7.71 | — | 2.77 | 3.22 | 3.46 | — |

Referring to Table 3, it can be seen that the case where one precoding matrix is applied to the whole bandwidth and the case where the precoding matrices are independently applied according to clusters are similar in terms of 99.9% PAPR and CM. Accordingly, it can be seen that, if the precoding matrices are equally applied according to clusters, the PAPR is not further increased. In contrast, if the precoding matrices are differently applied within the cluster, the PAPR is further increased (2PMs per cluster). In general, since a first row of the precoding matrix is fixed to 1 and the values of the residual rows excluding the first row are changed, the PAPR is not increased in the case of ANT1 (2PMs per cluster-ANT1) and a difference of a maximum of 0.29 dB occurs in ANT2 (2PMs per cluster-ANT2).

Method for Signaling/Allocating PMIs

In SC-FDMA transmission, since frequency-domain signals are spread to a wide band by a DFT process and the channel gains of subcarriers are changed by frequency selectivity, if one precoding matrix is applied to the whole frequency band, it is difficult to accomplish performance improvement. Accordingly, it is preferable that the precoding matrices be applied according to clusters in consideration of flexible scheduling and channel efficiency. Hereinafter, the method for signaling/allocating a PMI in order to apply the precoding matrices according to clusters will be described in detail with reference to the accompanying drawings.

First, symbols are defined in order to facilitate the understanding of the present invention.

$N_{SB}$: The number of subbands configuring the whole uplink band $L_{SB}$: The number of subcarriers configuring each of the subbands $N_{CL}$: The number of clusters allocated to a UE for uplink transmission $L_{CL,i}$ (i=0, ..., $N_{CL-1}$): The number of subcarriers configuring an $i^{th}$ cluster It is assumed that the maximum number of PMIs allocated to the UE is $N_{SB}$.

$N_{SB}$ and $L_{SB}$ may be fixed or semi-statically changed.

Since $N_{CL}$ and $L_{CL,i}$ depends on time-varying Channel State Information (CSI), $N_{CL}$ is changed according to uplink scheduling and $L_{CL,i}$ is independent of the clusters.

Figure 18:
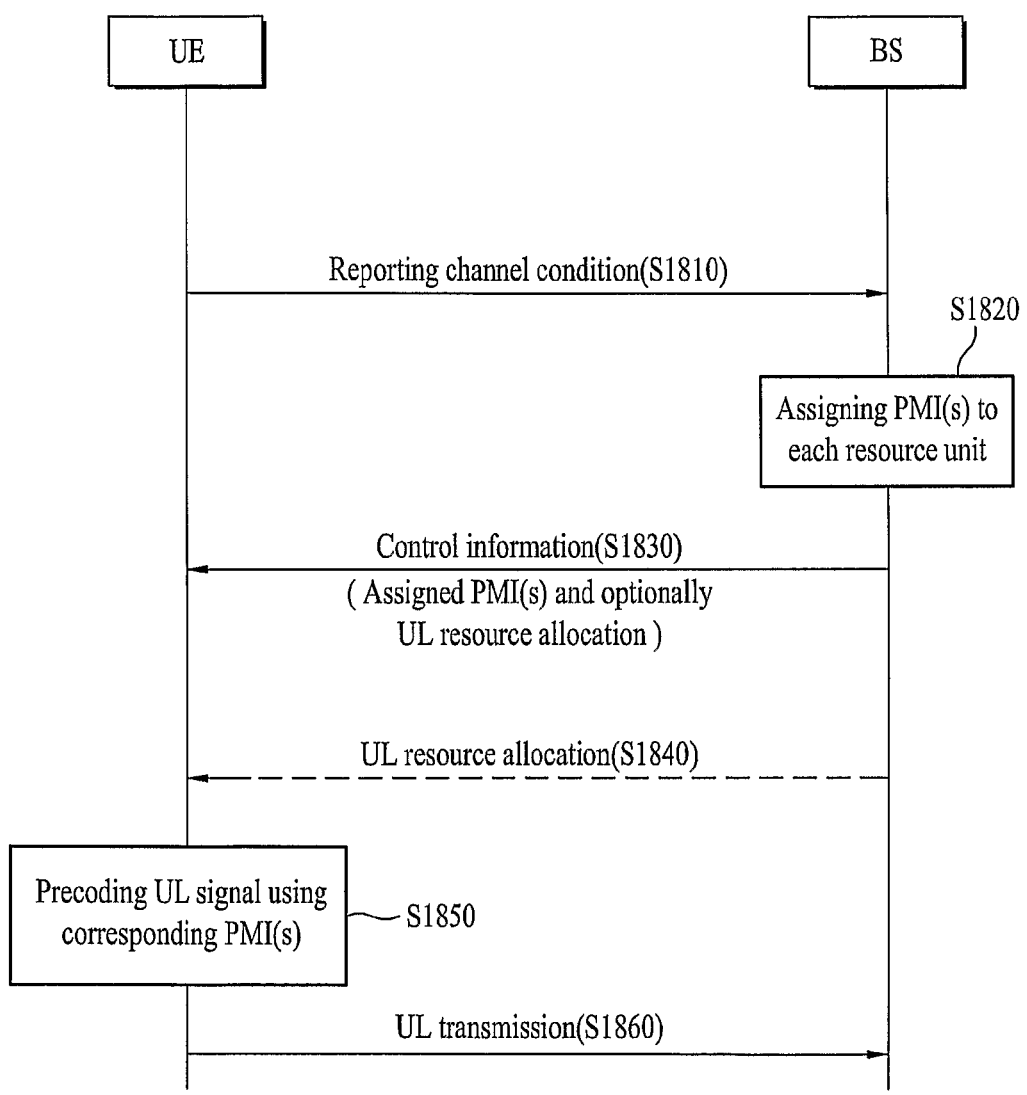
FIG. 18 is a view showing an example in which a base station signals a Precoding Matrix Indicator (PMI) to a User Equipment (UE).

FIG. 18 is a view showing an example in which a base station (BS) signals a PMI to a UE.

Referring to FIG. 18, the UE reports a channel condition to the BS (S1810). The reporting of the channel condition is preferably performed with respect to the whole band or may be performed in a state in which the band is divided into a predetermined number of subbands. The reporting of the channel condition may be periodically or non-periodically performed or may be triggered by an event. For example, the reporting of the channel condition may be performed using a Sounding Reference Signal (SRS). The BS allocates optimal PMI(s) to each resource unit based on channel state information obtained from the UE (S1820). The resource unit to which one PMI is applied includes a subband or a cluster. Thereafter, the BS transmits control information of the allocated PMI(s) to the UE (S1830). At this time, the control information may further include uplink (UL) resource allocation information. If the control information does not include the UL resource allocation information, the UL resource allocation information may be transmitted to the UE by a separate process (S1840). The control information may be transmitted via the PDCCH. In this case, the DCI transmitted via the PDCCH may further include PMI fields. In this case, the DCI may variably include one or more PMI fields or a fixed number of PMI fields. For example, the control information may have the format shown in Table 4.

TABLE 4

| Field | Bits | Comment |
|---|---|---|
| Format | 1 | Uplink grant or downlink assignment |
| Hopping flag | 1 | Frequency hopping on/off |
| RB assignment | 7 | — |
| MCS | 5 | — |
| PMI#1 | p | Precoding matrix indicator for 1st resource unit |
| . | . | — |
| . | . |  |
| . | . |  |
| PMI#N | p | Precoding matrix indicator for $N_{th}$ resource unit |
| . |  |  |
| . |  |  |
| . |  |  |
| RNTI/CRC | 16 | 16 bit RNTI implicitly encoded in CRC |
| Total | 38 + N × p | — |

* In PMI#N, N denotes an integer of 1 or more and may be varied or fixed.

Thereafter, the UE confirms the PMI(s) from the control information received from the BS. If the control information is transmitted via the PDCCH, the UE performs decoding with respect to the DCI carried in the PDCCH. The UE can obtain the PMI(s) associated with the cluster and the resource location for uplink transmission from the DCI. If the length of the DCI is changed according to the number of PMI fields, the UE may perform blind decoding using CRC with respect to several lengths. Thereafter, the UE precodes data to be transmitted to the BS using the precoding matrix indicated by the PMI(s) (S1850). Finally, the UE transmits the precoded data streams to the BS via multiple antennas (S1860).

Hereinafter, the method for allocating the PMI to the DCI will be described in detail. With respect to the method for allocating the PMI, four options may be considered according to the resource units to which the PMIs are allocated.

Option 1: Blind Decoding for DCI Sizes and Allocation of PMIs According to Subbands In Option 1, it is assumed that the UE performs blind decoding with respect to DCIs having various sizes. The BS allocates PMIs according to uplink subbands. Option 1 is applied regardless of the number $N_{CL}$ of scheduled clusters and the PMIs may be optimized with respect to clusters in the subband units. That is, the PMIs are allocated in subband units and the PMIs are allocated to one or more clusters within the corresponding subband. In view of the allocation of the PMIs, the subbands and the clusters are associated one-to-one with each other. Accordingly, if one cluster extends over two or more subbands, the cluster may be regularly or randomly associated with one subband. For example, if one cluster extends over two subbands, the cluster may be associated with a subband to which a larger number of resources is allocated. In Option 1, there is no additional remark, the subband refers to the subband associated with the cluster in view of the PMI allocation.

In detail, the BS may count the number ($N_{SB:CL}$) of subbands associated with the clusters and calculate optimal PMIs with respect to the clusters within the corresponding subbands. Thereafter, the BS allocates PMIs to $N_{SB:CL}$ PMI fields so as to configure DCI. The BS transmits the DCI including the PMIs to each UE via the PDCCH. Since the PMIs are signaled only with respect to the corresponding subbands, the DCI may have a smaller size compared with the case where the PMIs are signaled with respect to all the subbands. The UE receives the PDCCH from the BS and then performs blind decoding with respect to the DCI. Finally, the UE may acquire $N_{SB:CL}$ PMIs with respect to $N_{SB:CL}$ subbands.

As another example, in a specific cluster satisfying $L_{CL,i} > 1.5 \times L_{SB}$, the specific cluster extends over two or more subbands. In this case, in order to minimize waste of the PMI fields and reduce DCI overhead, cluster PMIs may be exceptionally allocated to the specific cluster. In this case, the PMI fields in the DCI may further include bit information for distinguishing between a subband PMI and a cluster PMI. By defining a first PMI set for subband and a second PMI set for cluster, the subband PMI and the cluster PMI can be distinguished using the values of the PMI fields.

Figure 19:
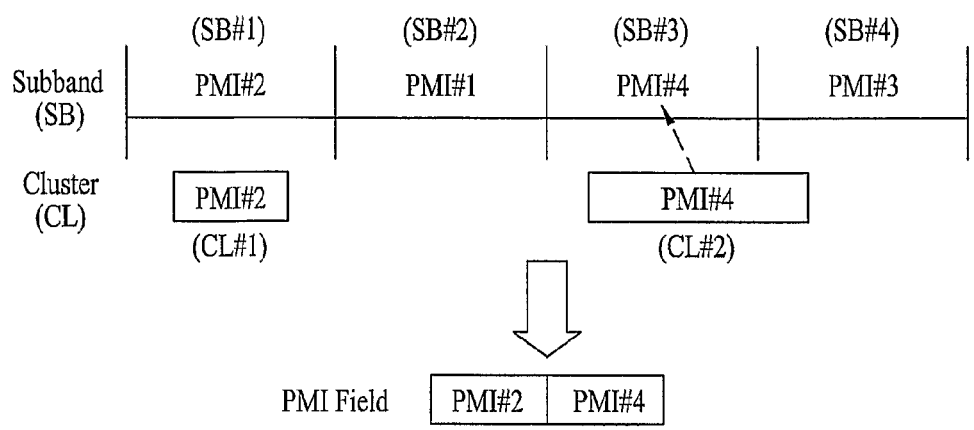
FIGS. 19 to 22 are views showing examples of allocating uplink PMIs according to Option 1.

FIG. 19 is a view showing an example of allocating uplink PMIs according to Option 1. In the present embodiment, it is assumed that $N_{SB}=4$ and $N_{CL}=2$. Referring to FIG. 19, according to the above-described criterion, a subband #1 (SB#1) is associated with a cluster #1 (CL#1). A subband #3 (SB#3) may be associated with a cluster #2 (CL#2). A subband #2 (SB#2) and a subband #4 (SB#4) are not associated with clusters. Accordingly, the BS may include only two PMI fields in the DCI and sequentially allocate optimal subband PMIs to CL#1 and CL#2 in the PMI fields (PMI#2-PMI#4).

Figure 20:
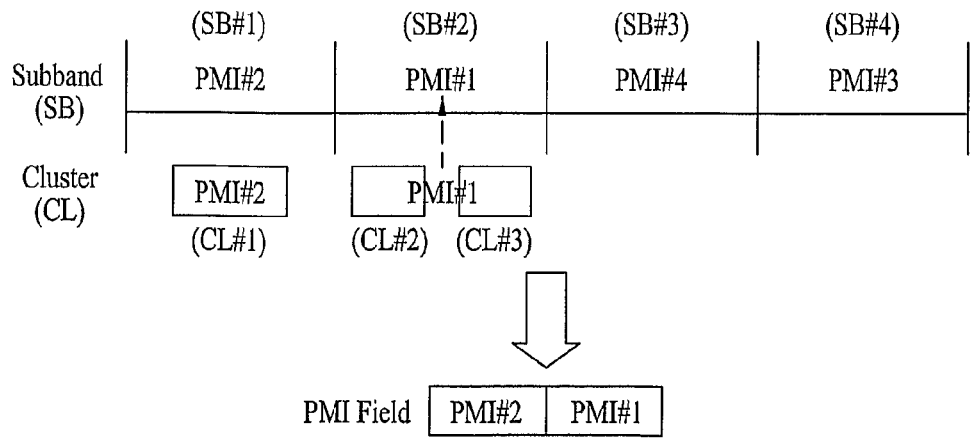

FIG. 20 is a view showing another example of allocating uplink PMIs according to Option 1. In the present embodiment, it is assumed that $N_{SB}=4$ and $N_{CL}=3$. Referring to FIG. 20, according to the above-described criterion, a subband #1 (SB#1) is associated with a cluster #1 (CL#1). A subband #2 (SB#2) is associated with a cluster #2 (CL#2) and a cluster #3 (CL#3). A subband #3 (SB#3) and a subband #4 (SB#4) are not associated with clusters. That is, the number $N_{SB:CL}$ of subbands associated with the clusters is 2. Accordingly, the BS may include only two PMI fields in the DCI and sequentially allocate optimal subband PMIs to CL#1 and CL#2/CL#3 in the PMI fields (PMI#2-PMI#1).

Figure 21:
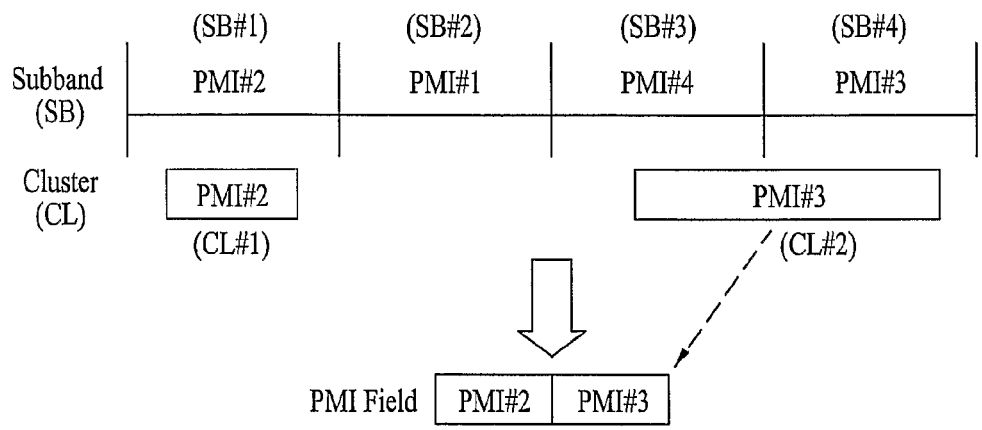

FIG. 21 is a view showing another example of allocating uplink PMIs according to Option 1. In the present embodiment, it is assumed that $N_{SB}=4$ and $N_{CL}=2$. Referring to FIG. 21, according to the above-described criterion, a subband #1 (SB#1) is associated with a cluster #1 (CL#1). A subband #4 (SB#4) may be associated with a cluster #2 (CL#2). A subband #2 (SB#2) and a subband #3 (SB#3) are not associated with clusters. That is, the number $N_{SB:CL}$ of subbands associated with the clusters is 2. Accordingly, the BS may include only two PMI fields in the DCI and sequentially allocate optimal subband PMIs to CL#1 and CL#2 in the PMI fields (PMI#2-PMI#3).

As another example, a cluster #1 (CL#1) is included in a subband #1 (SB#1), but a cluster #2 (CL#2) satisfies a size of $L_{CL,i} > 1.5 \times L_{SB}$ and is commonly included in a subband #3 (SB#3) and a subband #4 (SB#4). Accordingly, the exception when the cluster satisfies $L_{CL,i} > 1.5 \times L_{SB}$ is applicable. That is, the BS may include only two PMI fields in the DCI and allocate optimal subband PMIs ($PMI_{SB}$) to CL#1 and allocate optimal cluster PMIs ($PMI_{CL}$) to CL#2 in the PMI fields ($PMI_{SB}$#2-$PMI_{CL}$#3).

Figure 22:
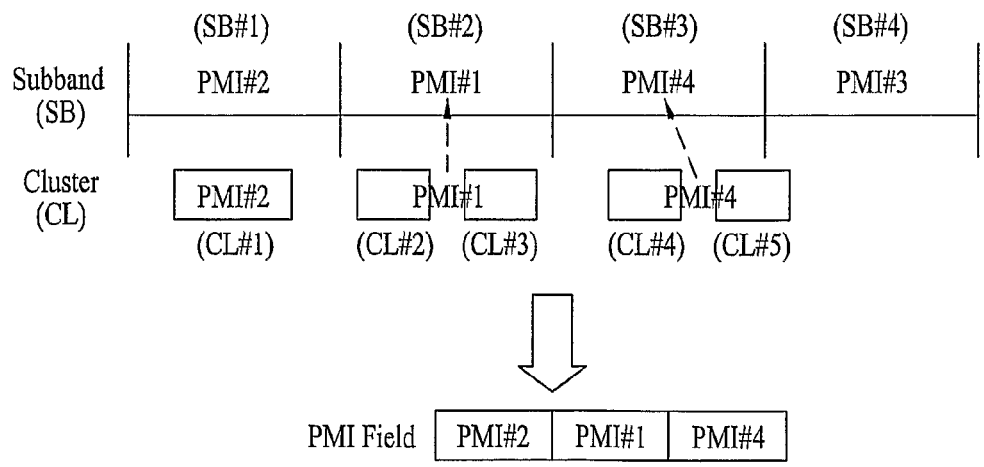

FIG. 22 is a view showing another example of allocating uplink PMIs according to Option 1. In the present embodiment, it is assumed that $N_{SB}=4$ and $N_{CL}=5$. Referring to FIG. 22, according to the above-described criterion, a subband #1 (SB#1) is associated with a cluster #1 (CL#1). A subband #2 (SB#2) is associated with a cluster #2 (CL#2) and a cluster #3 (CL#3). A subband #3 (SB#3) may be associated with a cluster #4 (CL#4) and a cluster #5 (CL#5). A subband #4 (SB#4) is not associated with clusters. That is, the number $N_{SB:CL}$ of subbands associated with the clusters is 3. Accordingly, the BS may include only three PMI fields in the DCI and sequentially allocate optimal subband PMIs to CL#1 and CL#2/CL#3 and CL#4/CL#5 in the PMI fields (PMI#2-PMI#1-PMI#4).

Option 2: Blind Decoding for DCI Sizes and Allocation of PMIs According to Clusters In Option 2, it is assumed that the UE performs blind decoding with respect to DCIs having various sizes. The BS allocates PMIs according to uplink subbands. Option 2 is applied regardless of the number $N_{CL}$ of scheduled clusters and the PMIs may be optimized with respect to the clusters. However, for several reasons, the maximum number of PMIs which can be transmitted from the BS to the UE may be restricted. For example, the maximum number of PMIs may be restricted by the number of subbands, $N_{SB}$. In this case, Option 2 is applicable to the case where the number of scheduled clusters is equal to or less than the maximum number of PMIs which can be transmitted to the UE. The PMIs may be optimized with respect to the clusters.

In detail, the BS calculates $N_{CL}$ PMIs with respect to $N_{CL}$ clusters scheduled for the UE. Thereafter, the BS allocates PMIs to $N_{CL}$ PMI fields so as to configure DCI. The BS transmits the DCI including the PMIs to each UE via the PDCCH. Since the PMIs are signaled only with respect to the scheduled clusters, the DCI may have a smaller size compared with the case where the PMIs are signaled with respect to all subbands. The UE receives the PDCCH from the BS and then performs blind decoding with respect to the DCI. Finally, the UE may acquire $N_{CL}$ PMIs with respect to $N_{CL}$ clusters.

Figure 23:
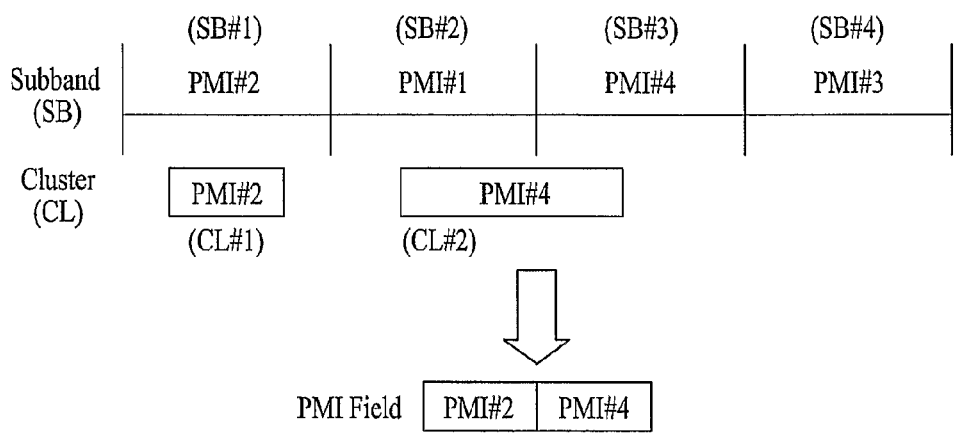
FIGS. 23 to 25 are views showing an example of allocating uplink PMIs according to Option 2.

FIG. 23 is a view showing an example of allocating uplink PMIs according to Option 2. In the present embodiment, it is assumed that $N_{SB}$=4 and $N_{CL}$=2. Referring to FIG. 23, the BS schedules two clusters for the UE. Accordingly, the BS may include only two PMI fields in the DCI and sequentially allocate optimal cluster PMIs to CL#1 and CL#2 in the PMI fields (PMI#2-PMI#4).

Figure 24:
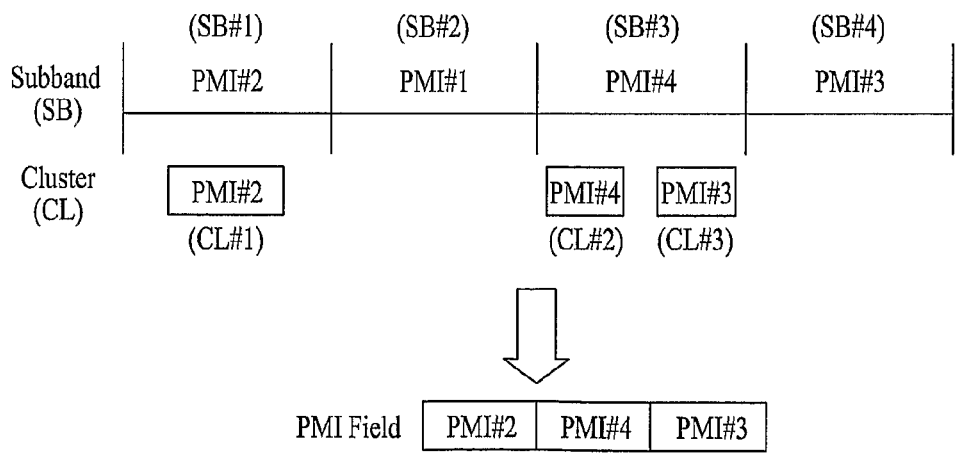

FIG. 24 is a view showing an example of allocating uplink PMIs according to Option 2. In the present embodiment, it is assumed that $N_{SB}$=4 and $N_{CL}$=3. Referring to FIG. 24, the BS schedules three clusters for the UE. Accordingly, the BS may include only three PMI fields in the DCI and sequentially allocate optimal cluster PMIs to CL#1, CL#2 and CL#3 in the PMI fields (PMI#2-PMI#4-PMI#3).

Figure 25:
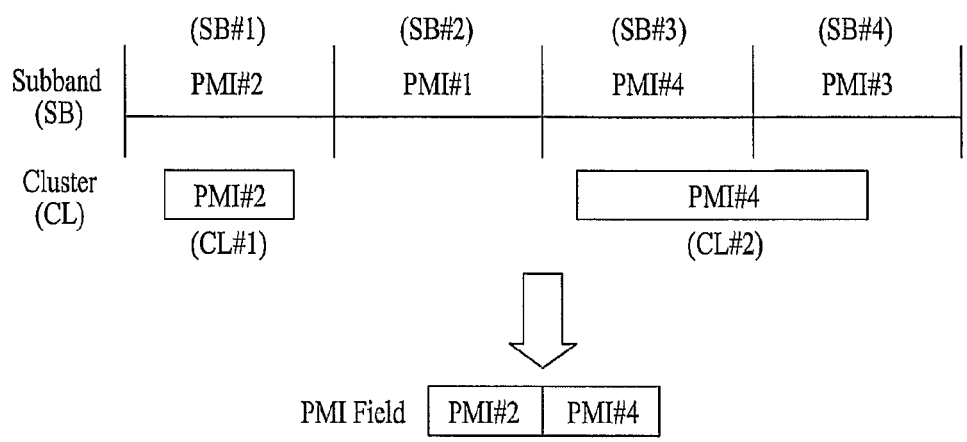

FIG. 25 is a view showing an example of allocating uplink PMIs according to Option 2. In the present embodiment, it is assumed that $N_{SB}$=4 and $N_{CL}$=2. Referring to FIG. 25, the BS schedules two clusters for the UE. Accordingly, the BS may include only two PMI fields in the DCI and sequentially allocate optimal cluster PMIs to CL#1 and CL#2 in the PMI fields (PMI#2-PMI#4).

Option 3: Non-Blind Decoding for DCI Sizes and Allocation of PMIs According to Subbands In Option 3, it is assumed that the UE cannot perform blind decoding with respect to DCIs having various sizes. The BS allocates PMIs according to uplink subbands. Accordingly, the DCI always includes $N_{SB}$ PMI fields. Option 3 is applied regardless of the number $N_{CL}$ of scheduled clusters and the PMIs may be optimized with respect to clusters in the subband units. If a specific subband does not include a cluster, the PMIs allocated to the specific subband may be optimized with respect to all the subcarriers within the subband. Accordingly, the PMIs are allocated in subband units and each PMI is allocated to one or more clusters within the corresponding subband. In view of the allocation of the PMIs, the subbands and the clusters are associated one-to-one with each other. Accordingly, if one cluster extends over two or more subbands, the cluster may be regularly or randomly associated with one subband. For example, if one cluster extends over two subbands, the cluster may be associated with a subband to which a larger number of resources is allocated.

In detail, the BS may determine whether each subband includes clusters and may calculate PMIs with respect to all subbands ($N_{SB}$ PMIs). Thereafter, the BS allocates PMIs to $N_{SB}$ PMI fields so as to configure DCI having a fixed size. The BS transmits the DCI including the PMIs to the UE via the PDCCH. In Option 4, a PMI portion of the DCI has a fixed size corresponding to the number $N_{SB}$ of uplink subbands. Since the UE cannot perform blind decoding, the size of the DCI is shared between the BS and the UE. The UE receives the PDCCH from the BS and then performs decoding with respect to the DCI. Finally, the UE may acquire $N_{SB}$ PMIs allocated to the subbands.

In general, a PMI allocation period may be larger than a cluster allocation period. In this case, the PMIs may not be optimized with respect to the clusters within the subband but may be optimized with respect to the subband itself. For example, if some DCI formats are not included in the PMI fields, the PMIs optimized with respect to the subband may be reused in the clusters associated with the corresponding subband at a next scheduling time.

Figure 26:
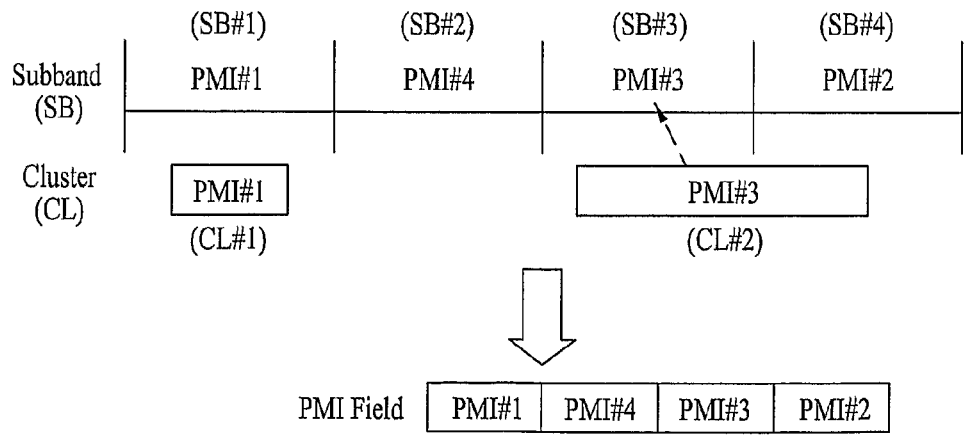
FIGS. 26 to 29 are views showing examples of allocating uplink PMIs according to Option 3.

FIG. 26 is a view showing an example of allocating uplink PMIs according to Option 3. In the present embodiment, it is assumed that $N_{SB}$=4 and $N_{CL}$=2. Referring to FIG. 26, according to the above-described criterion, a subband #1 (SB#1) is associated with a cluster #1 (CL#1). A subband #3 (SB#3) may be associated with a cluster #2 (CL#2). A subband #2 (SB#2) and a subband #4 (SB#4) are not associated with clusters. In this case, the BS includes $N_{SB}$ PMI fields in the DCI and generates DCI having a fixed size. Thereafter, the BS may sequentially allocate subband PMIs optimized to CL#1, SB#2, CL#2 and SB#4 repectively in the PMI fields (PMI#1-PMI#4-PMI#3-PMI#2).

Figure 27:
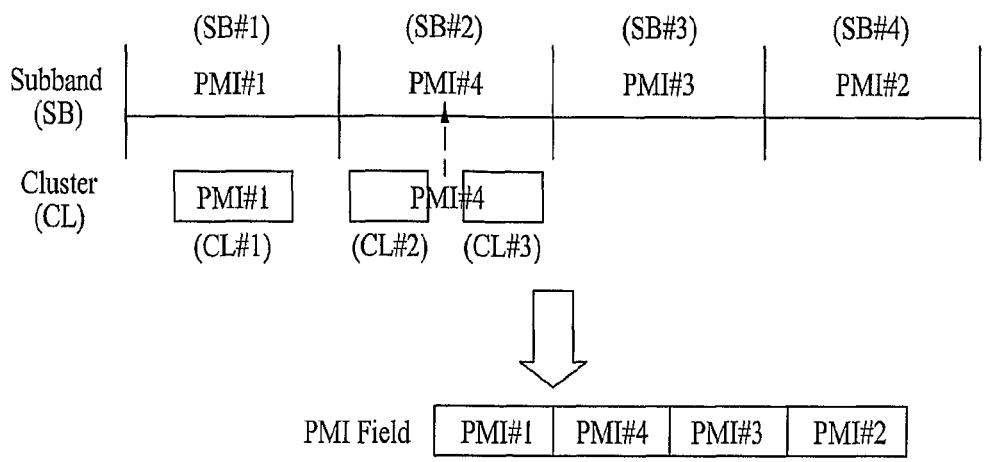

FIG. 27 is a view showing another example of allocating uplink PMIs according to Option 3. In the present embodiment, it is assumed that $N_{SB}$=4 and $N_{CL}$=3. Referring to FIG. 27, according to the above-described criterion, a subband #1 (SB#1) is associated with a cluster #1 (CL#1). A subband #2 (SB#2) is associated with a cluster #2 (CL#2) and a cluster #3 (CL#3). A subband #3 (SB#3) and a subband #4 (SB#4) are not associated with clusters. In this case, the BS includes $N_{SB}$ PMI fields in the DCI and generates DCI having a fixed size. Thereafter, the BS may sequentially allocate subband PMIs optimized to CL#1, CL#2/CL#3, SB#3 and SB#4 respectively in the PMI fields (PMI#1-PMI#4-PMI#3-PMI#2).

Figure 28:
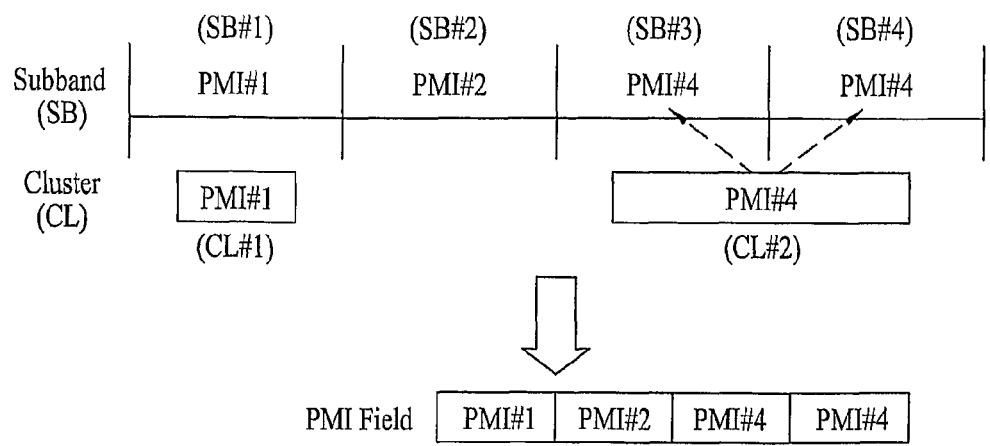

FIG. 28 is a view showing another example of allocating uplink PMIs according to Option 3. In the present embodiment, it is assumed that $N_{SB}$=4 and $N_{CL}$=2. Referring to FIG. 28, according to the above-described criterion, a subband #1 (SB#1) is associated with a cluster #1 (CL#1). A subband #3 (SB#3) or a subband #4 (SB#4) may be associated with a cluster #2 (CL#2). A subband #2 (SB#3) is not associated with clusters. In this case, the BS includes $N_{SB}$ PMI fields in the DCI and generates DCI having a fixed size. Thereafter, the BS may sequentially allocate subband PMIs optimized to CL#1, SB#2, CL#2 and CL#2 respectively in the PMI fields (PMI#1-PMI#2-PMI#4-PMI#4).

Figure 29:
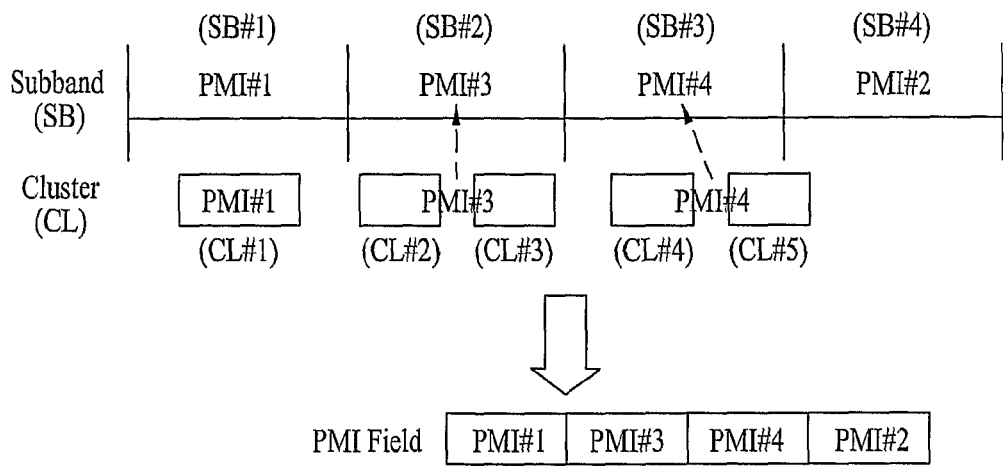

FIG. 29 is a view showing another example of allocating uplink PMIs according to Option 3. In the present embodiment, it is assumed that $N_{SB}$=4 and $N_{CL}$=5. Referring to FIG. 29, according to the above-described criterion, a subband #1 (SB#1) is associated with a cluster #1 (CL#1). A subband #2 (SB#2) is associated with a cluster #2 (CL#2) and a cluster #3 (CL#3). A subband #3 (SB#3) may be associated with a cluster #4 (CL#4) and a cluster #5 (CL#5). A subband #4 (SB#4) is not associated with clusters. In this case, the BS includes $N_{SB}$ PMI fields in the DCI and generates DCI having a fixed size. Thereafter, the BS may sequentially allocate subband PMIs optimized to CL#1, CL#2/CL#3 and CL#4/CL#5 respectively in the PMI fields (PMI#1-PMI#3-PMI#4-PMI#2).

Option 4: Non-Blind Decoding for DCI Sizes and Allocation of PMIs According to Clusters In Option 4, it is assumed that the UE cannot perform blind decoding with respect to DCIs having various sizes.

The BS allocates PMIs to scheduled clusters. In Option 4, since the DCI has a fixed size, the maximum number of PMIs which can be transmitted from the BS to the UE is restricted. In this case, Option 4 is applicable to the case where the number of scheduled clusters is equal to or less than the maximum number of PMIs which can be transmitted to the UE. For example, the maximum number of PMIs may be defined by the number of subbands, $N_{SB}$. Hereinafter, for convenience, it is assumed that the maximum number of PMI fields included in the DCI is $N_{SB}$.

In detail, the BS calculates $N_{CL}$ PMIs with respect to $N_{CL}$ clusters scheduled for the UE. Thereafter, the BS allocates $N_{CL}$ PMIs to $N_{CL}$ PMI fields so as to configure DCI having a fixed size. Accordingly, $N_{CL}$ fields out of $N_{SB}$ PMI fields included in the DCI have valid values and $N_{SB}$-$N_{CL}$ fields have invalid values. The BS transmits the DCI including the PMIs to the UE via the PDCCH. Since the UE cannot perform blind decoding, the size of the DCI is shared between the BS and the UE. The UE receives the PDCCH from the BS and then performs decoding with respect to the DCI. Finally, the UE may acquire $N_{SB}$ PMIs. The UE uses only the first $N_{CL}$ PMIs out of the $N_{SB}$ PMIs for precoding the $N_{CL}$ clusters, and residual $N_{SB}$-$N_{CL}$ PMIs may be ignored. In order to minimize waste of the PMI fields, the residual $N_{SB}$-$N_{CL}$ PMIs may be used for allocating the PMIs to the whole band or subband groups.

Figure 30:
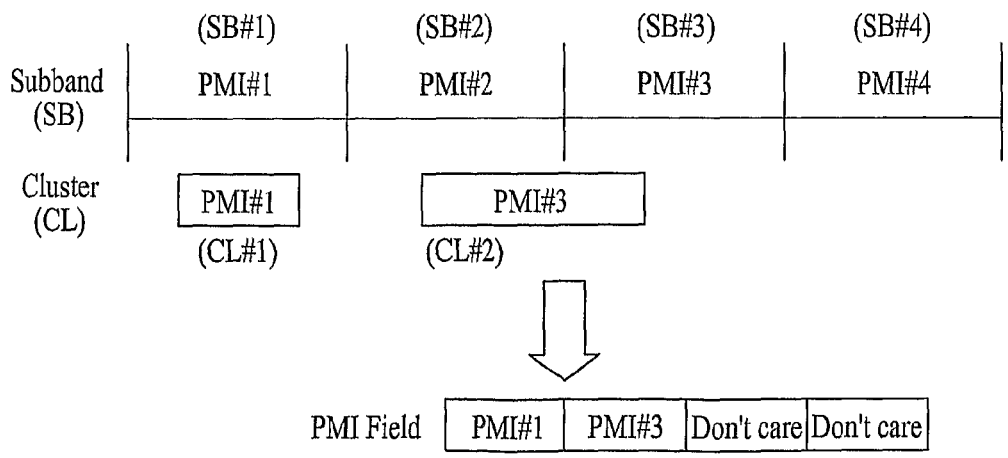
FIGS. 30 to 32 are views showing examples of allocating uplink PMIs according to Option 4.

FIG. 30 is a view showing an example of allocating uplink PMIs according to Option 4. In the present embodiment, it is assumed that $N_{SB}$=4 and $N_{CL}$=2. The present embodiment is applicable regardless of the locations and/or the sizes of the clusters. Referring to FIG. 30, the BS includes $N_{SB}$ PMI fields in the DCI and generates DCI having a fixed size. Thereafter, the BS may allocate PMIs optimized with respect to CL#1 and CL#2 to the first two PMI fields and allocate invalid PMIs to the two residual PMI fields (PMI#1-PMI#3-$PMI_{invalid}$-$PMI_{invalid}$).

Figure 31:
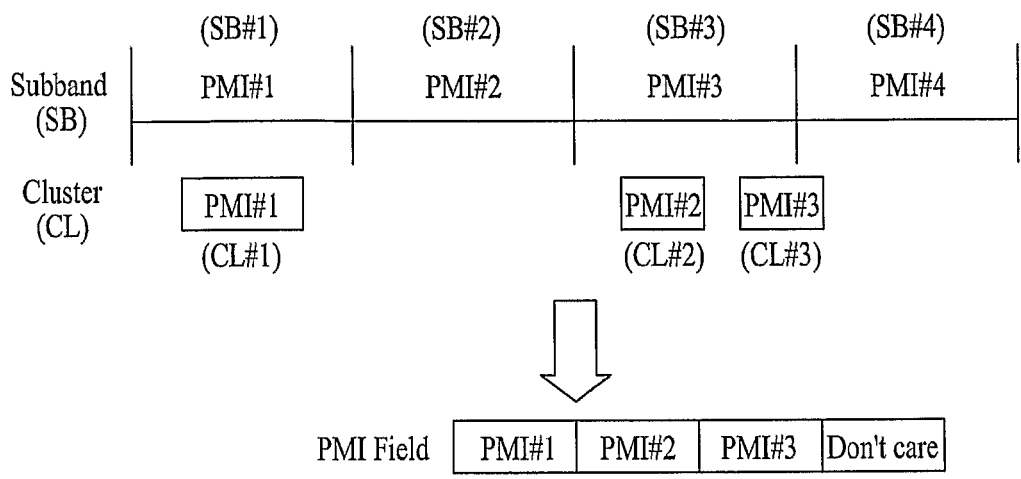

FIG. 31 is a view showing another example of allocating uplink PMIs according to Option 4. In the present embodiment, it is assumed that $N_{SB}$=4 and $N_{CL}$=3. Referring to FIG. 31, the BS includes $N_{SB}$ PMI fields in the DCI and generates DCI having a fixed size. Thereafter, the BS may allocate PMIs optimized with respect to CL#1, CL#2 and CL#3 to the first three PMI fields and allocate invalid PMIs to one residual PMI field (PMI#1-PMI#2-PMI#3-$PMI_{invalid}$).

Figure 32:
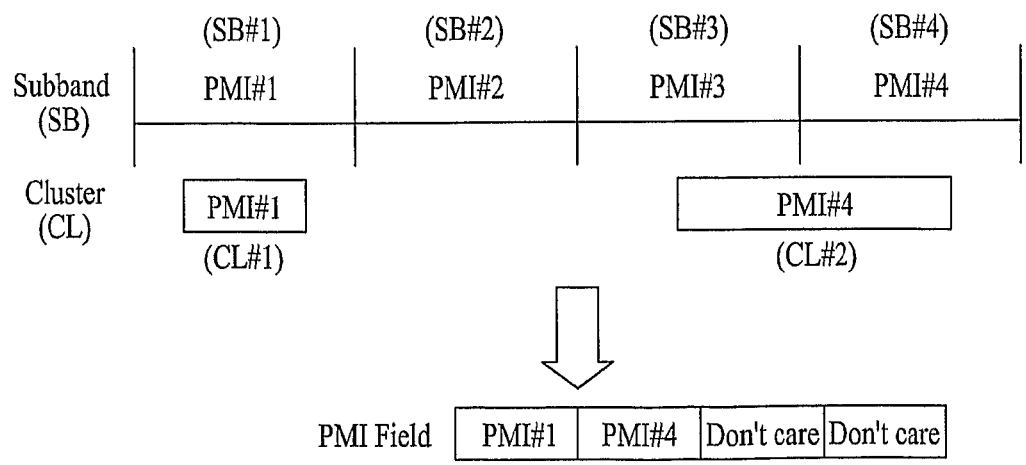

FIG. 32 is a view showing another example of allocating uplink PMIs according to Option 4. In the present embodiment, it is assumed that $N_{SB}$=4 and $N_{CL}$=2. Referring to FIG. 32, the BS includes $N_{SB}$ PMI fields in the DCI and generates DCI having a fixed size. Thereafter, the BS may allocate PMIs optimized with respect to CL#1, CL#2 and CL#3 to the first two PMI fields and allocate invalid PMIs to the two residual PMI fields (PMI#1-PMI#4-$PMI_{invalid}$-$PMI_{invalid}$)

Figure 33:
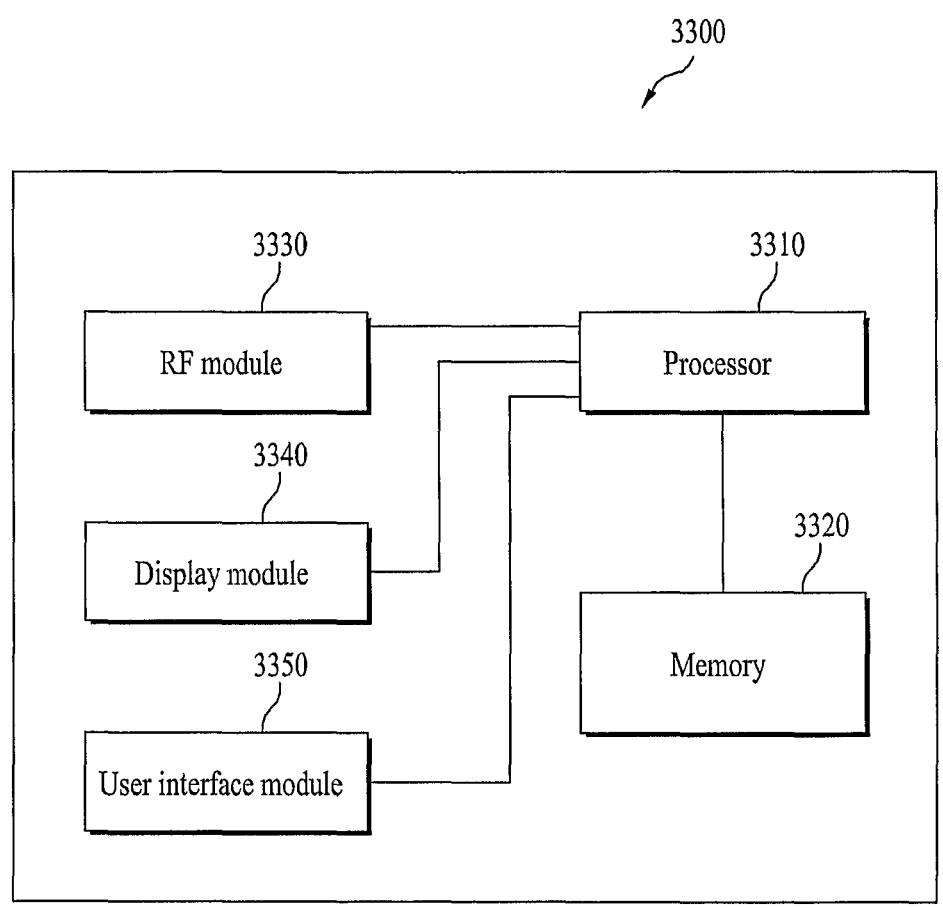
FIG. 33 is a view showing a transmitter or receiver according to an embodiment of the present invention.

FIG. 33 is a view showing a transmitter or receiver according to an embodiment of the present invention. The transmitter or the receiver may be a portion of a BS or a UE.

Referring to FIG. 33, the transmitter or receiver 3300 includes a processor 3310, a memory 3320, an RF module 3330, a display module 3340, and a user interface module 3350. The transmitter or receiver 3300 is shown for convenience of description and some modules may be omitted or added. In addition, the transmitter or receiver 3300 may further include necessary modules. In addition, in the transmitter or receiver 3300, some modules may be subdivided. The processor 3320 is configured to perform the operation according to the embodiments of the present invention shown in the drawings. The detailed operation of the process 3320 may refer to the contents described in FIGS. 1 to 32. The memory 3320 is connected to the processor 3310 and stores an operating system, an application, a program code and data. The RF module 3330 is connected to the processor 3310 and performs a function for converting a baseband signal into a radio-frequency signal or converting a radio-frequency signal into a baseband signal. For example, the RF module 3330 may perform analog conversion, amplification, filtering and frequency up-conversion or inverse processes thereof. The display module 3340 is connected to the processor 3310 and displays a variety of information. The display unit 3340 includes, but is not limited to, known devices such as a Liquid Crystal Display (LCD), a Light Emitting Diode (LED) and an Organic Light Emitting Diode (OLED). The user interface module 3350 is connected to the processor 3310 and may be configured by a combination of known user interfaces such as a keypad, a touch screen and the like.

The above-mentioned embodiments of the present invention are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations disclosed in the embodiments of the present invention may be changed to another. Some components or characteristics of any embodiment may also be included in other embodiments, or may be replaced with those of the other embodiments as necessary. It will be apparent that embodiments may be configured by combining claims without an explicit relationship therebetween or new claims may be added by amendment after application.

The embodiments of the present invention may be implemented by various means such as hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be executed by a processor. The memory unit may be located inside or outside of the processor, so that it can communicate with the aforementioned processor via a variety of well-known means.

MODE FOR INVENTION

Various embodiments have been described in the best mode for carrying out the invention.

[Industrial Applicability]

The present invention is applicable to a radio communication system. The present invention is applicable to a radio communication system for supporting at least one of Single Carrier-Frequency Division Multiple Access (SC-FDMA), Multi Carrier-Frequency Division Multiple Access (MC-FDMA) and Orthogonal Frequency Division Multiple Access (OFDMA). In detail, the present invention is applicable to a precoding method for reducing an uplink Peak-to-Average Power Ratio (PAPR) in a radio communication system and an apparatus thereof.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for uplink transmission via multiple antennas by a user equipment in a radio communication system, the method comprising:

receiving scheduling information and precoding matrix indicator (PMI) information for the uplink transmission from a base station, wherein a plurality of clusters including a first cluster and a second cluster are scheduled for the uplink transmission by the scheduling information, and the PMI information includes a plurality of PMI fields including a first PMI field indicating a first precoding matrix and a second PMI field indicating a second precoding matrix being different from the first precoding matrix;

performing Fourier transform on one or more data sequences to generate a first plurality of frequency-domain sequences, wherein each frequency-domain sequence of the first plurality of frequency-domain sequences includes a first portion corresponding to a first cluster and a second portion corresponding to a second cluster;

precoding the first plurality of frequency-domain sequences to generate a second plurality of frequency-domain sequences, wherein the first portion is precoded with the first precoding matrix and the second portion is precoded with the second precoding matrix;

performing inverse Fourier transform on the second plurality of frequency-domain sequences to generate one or more transmission symbols; and transmitting the one or more transmission symbols via the multiple antennas.

2. The method according to claim 1, further comprising continuously or discontinuously mapping the second plurality of frequency-domain sequences within a frequency band.

3. The method according to claim 2, wherein the second plurality of frequency-domain sequences are mapped to the plurality of clusters within the frequency band.

4. The method according to claim 1, wherein the plurality of clusters are discontinuous within a frequency band.

5. The method according to claim 1, wherein a size of the first cluster is different from a size of the second cluster.

6. The method according to claim 1, wherein the scheduling information and the PMI information are included within Downlink Control Information (DCI) received via a Physical Downlink Control Channel (PDCCH).

7. The method according to claim 1, wherein a number of the plurality of PMI fields is equal to a number of subbands scheduled for the uplink transmission.

8. The method according to claim 1, wherein a number of the plurality of PMI fields is equal to a number of subbands associated with the plurality of clusters.

9. The method according to claim 1, wherein a number of the plurality of PMI fields is equal to a number of the plurality of clusters.

10. The method according to claim 1, wherein a number of the plurality of PMI fields is constantly maintained regardless of the scheduling information.

11. The method according to claim 10, wherein the number of the plurality of PMI fields is equal to a total number of subbands present within the frequency band.

12. The method according to claim 10, wherein, if the PMI information includes more fields than the number of the plurality of PMI fields, a predetermined value is included in a remaining field of the PMI information other than the plurality of PMI fields.

13. A user equipment to perform uplink transmission via multiple antennas in a radio communication system, the user equipment comprising:

a radio frequency (RF) module; and a processor, wherein the processor is configured to:

receive scheduling information and precoding matrix indicator (PMI) information for the uplink transmission from a base station through the RF module, wherein a plurality of clusters including a first cluster and a second cluster are scheduled for the uplink transmission by the scheduling information, and the PMI information includes a plurality of PMI fields including a first PMI field indicating a first precoding matrix and a second PMI field indicating a second precoding matrix being different from the first precoding matrix, perform Fourier transform on one or more data sequences to generate a first plurality of frequency-domain sequences, wherein each frequency-domain sequence of the first plurality of frequency-domain sequences includes a first portion corresponding to a first cluster and a second portion corresponding to a second cluster, precode the first plurality of frequency-domain sequences to generate a second plurality of frequency-domain sequences, wherein the first portion is precoded with the first precoding matrix and the second portion is precoded with the second precoding matrix, perform inverse Fourier transform on the second plurality of frequency-domain sequences to generate one or more transmission symbols, and transmit the one or more transmission symbols via the multiple antennas.

* * * * *